US012661538B2

(12) United States Patent
Carroccia et al.

(10) Patent No.: US 12,661,538 B2
(45) Date of Patent: *Jun. 23, 2026

(54) FORCE DAMPER

(71) Applicant: On Top Safety Equipment, LLC, Cheektowaga, NY (US)

(72) Inventors: John J. Carroccia, Orchard Park, NY (US); Jeffrey L. Murray, Hamburg, NY (US)

(73) Assignee: ON TOP SAFETY EQUIPMENT, LLC, Cheektowaga, NY (US)

( * ) Notice: Subject to any disclaimer, the term of this patent is extended or adjusted under 35 U.S.C. 154(b) by 1043 days.

This patent is subject to a terminal disclaimer.

(21) Appl. No.: 17/305,690

(22) Filed: Jul. 13, 2021

(65) Prior Publication Data

US 2021/0339064 A1 Nov. 4, 2021

Related U.S. Application Data

(60) Division of application No. 16/784,939, filed on Feb. 7, 2020, now Pat. No. 11,090,518, which is a
(Continued)

(51) Int. Cl.
| | |
|---|---|
| *A62B 35/04* | (2006.01) |
| *A62B 35/00* | (2006.01) |
| *F16F 13/00* | (2006.01) |

(52) U.S. Cl.
CPC .......... *A62B 35/04* (2013.01); *A62B 35/0068* (2013.01); *F16F 13/005* (2013.01);
(Continued)

(58) Field of Classification Search
CPC .......... F16F 13/005; F16F 13/04; F16F 7/003; F16F 7/12; F16F 2224/0208;
(Continued)

(56) References Cited

U.S. PATENT DOCUMENTS

| | | | | | |
|---|---|---|---|---|---|
| 2,373,508 | A | * | 4/1945 | Snyder | .................... F16F 7/095 |
| | | | | | 188/129 |
| 2,404,666 | A | * | 7/1946 | Snyder | ..................... F16F 7/09 |
| | | | | | 267/213 |

(Continued)

FOREIGN PATENT DOCUMENTS

| | | |
|---|---|---|
| DE | 202008002704 | 5/2008 |
| DE | 202008002704 U1 * | 6/2008 ............. A62B 35/04 |

OTHER PUBLICATIONS

Model No. 1340101 PROTM Stretch Shock Absorbing Lanyard manufactured by Protecta®, 3M Protecta Catalog Rev E, Fall 2016—previously submitted in parent application.

*Primary Examiner* — Daniel P Cahn
*Assistant Examiner* — Shiref M Mekhaeil
(74) *Attorney, Agent, or Firm* — Simpson & Simpson, PLLC

(57) ABSTRACT

A force damper arranged to progressively arrest a first force imparted by an object moving in a first direction is disclosed. The force damper includes a housing enclosure having a first housing end and a second housing end. The first housing end includes a first connection point, and the second housing end includes an opening. A driving member is disposed within the housing enclosure and includes a first shaft end, a second shaft end, and a shaft therebetween. The first shaft end includes a stop and the second shaft end includes a second connection point. A compressible member is disposed within the housing enclosure between the stop and the opening. The compressible member is formed from a material that at least partially undergoes plastic deformation when the first force is arrested and imparts a second force on the stop toward first housing end.

7 Claims, 21 Drawing Sheets

Related U.S. Application Data continuation-in-part of application No. 16/113,618, filed on Aug. 27, 2018.

(60) Provisional application No. 62/610,786, filed on Dec. 27, 2017.

(52) U.S. Cl.
CPC .................. *F16F 2224/0208* (2013.01); *F16F 2224/0225* (2013.01); *F16F 2224/025* (2013.01)

(58) Field of Classification Search
CPC ........... F16F 2224/0233; F16F 2228/14; F16F 2230/0047; F16F 2232/08; F16F 2224/0225; F16F 2224/025; A62B 35/04; B60G 11/48; B60G 11/50; B60G 11/52; B60G 11/54; B60G 11/56; B60G 11/58; B60G 11/60; B60G 11/62; B60G 11/64
See application file for complete search history.

(56) References Cited

U.S. PATENT DOCUMENTS

| | | | | | |
|---|---|---|---|---|---|
| 2,421,822 | A | * | 6/1947 | Wood | F16L 3/18 |
| | | | | | 248/562 |
| 2,678,796 | A | * | 5/1954 | Roy | F16F 3/10 |
| | | | | | 267/152 |
| 2,724,463 | A | * | 11/1955 | Becker | A47L 3/04 |
| | | | | | 182/4 |
| 3,462,137 | A | * | 8/1969 | Grube | B60P 7/0823 |
| | | | | | 410/41 |
| 3,610,606 | A | * | 10/1971 | Andrews | F16F 15/04 |
| | | | | | 269/162 |
| 3,637,174 | A | * | 1/1972 | Kuo | C10G 9/20 |
| | | | | | 188/1.11 R |
| 3,862,673 | A | * | 1/1975 | Benson | F16F 1/3713 |
| | | | | | 280/805 |
| 4,154,140 | A | * | 5/1979 | Zeilon | F16B 13/025 |
| | | | | | 411/16 |
| 4,601,367 | A | * | 7/1986 | Bongers | B29D 28/005 |
| | | | | | 293/133 |
| 4,624,493 | A | * | 11/1986 | Hillebrand | B60R 19/34 |
| | | | | | 267/140 |
| 4,955,467 | A | * | 9/1990 | Kallenbach | F16F 7/09 |
| | | | | | 188/134 |
| 4,976,443 | A | * | 12/1990 | DeLucia | F42B 6/08 |
| | | | | | 473/583 |
| 5,240,232 | A | * | 8/1993 | Loziuk | F16L 3/2056 |
| | | | | | 267/136 |
| 5,257,680 | A | * | 11/1993 | Corcoran | F16F 13/04 |
| | | | | | 188/290 |
| 5,332,071 | A | * | 7/1994 | Duncan | E04G 21/3295 |
| | | | | | 267/74 |
| 5,358,068 | A | * | 10/1994 | Whitmer | E04G 21/3204 |
| | | | | | 182/113 |
| 5,458,214 | A | * | 10/1995 | Olson | F16F 7/00 |
| | | | | | 182/18 |
| 5,468,019 | A | * | 11/1995 | Blase | B60R 22/4619 |
| | | | | | 297/480 |

| | | | | | |
|---|---|---|---|---|---|
| 5,588,511 | A | * | 12/1996 | Kallenbach | F16L 3/20 |
| | | | | | 188/134 |
| 5,799,760 | A | * | 9/1998 | Small | A62B 35/04 |
| | | | | | 267/155 |
| 6,471,198 | B2 | * | 10/2002 | Herbst | F16F 1/40 |
| | | | | | 267/293 |
| 6,485,411 | B1 | * | 11/2002 | Konstorum | A61B 1/00078 |
| | | | | | 604/527 |
| 6,854,574 | B2 | * | 2/2005 | Yoshida | B60R 19/34 |
| | | | | | 293/133 |
| 7,007,350 | B1 | * | 3/2006 | Franke | E04G 21/3276 |
| | | | | | 24/136 B |
| 7,579,550 | B2 | * | 8/2009 | Dayton | A61B 1/0055 |
| | | | | | 174/108 |
| 8,182,023 | B2 | * | 5/2012 | Nagwanshi | B60R 19/18 |
| | | | | | 296/187.09 |
| 8,608,142 | B2 | * | 12/2013 | Von Allmen | F16F 7/128 |
| | | | | | 267/170 |
| 8,820,493 | B2 | * | 9/2014 | Parida | F16F 9/303 |
| | | | | | 188/374 |
| 9,422,999 | B2 | * | 8/2016 | Hermann | F16F 13/1409 |
| 10,663,110 | B1 | * | 5/2020 | Rawas | B33Y 50/02 |
| 11,293,509 | B2 | * | 4/2022 | Muraguchi | F16F 1/127 |
| 2002/0165532 | A1 | * | 11/2002 | Hill, III | A61B 18/1492 |
| | | | | | 606/41 |
| 2002/0177906 | A1 | * | 11/2002 | Phillips | A61F 2/60 |
| | | | | | 623/27 |
| 2004/0145098 | A1 | * | 7/2004 | Thaler | F16F 1/445 |
| | | | | | 267/33 |
| 2006/0289708 | A1 | * | 12/2006 | Lin | B60R 11/00 |
| | | | | | 248/160 |
| 2009/0107781 | A1 | * | 4/2009 | Fritz | F16F 9/585 |
| | | | | | 188/280 |
| 2010/0000504 | A1 | * | 1/2010 | Trpkovski | F41B 5/0094 |
| | | | | | 124/25.6 |
| 2011/0114427 | A1 | * | 5/2011 | Parida | F16F 9/303 |
| | | | | | 29/428 |
| 2011/0227353 | A1 | * | 9/2011 | Nagwanshi | F16F 1/04 |
| | | | | | 293/137 |
| 2011/0233975 | A1 | * | 9/2011 | Mindel | B64D 11/0689 |
| | | | | | 188/371 |
| 2012/0186436 | A1 | * | 7/2012 | Parida | B61G 11/12 |
| | | | | | 89/930 |
| 2012/0193165 | A1 | * | 8/2012 | Vetesnik | F16F 7/125 |
| | | | | | 188/65.1 |
| 2012/0264523 | A1 | * | 10/2012 | Liebing | F16C 1/06 |
| | | | | | 464/60 |
| 2014/0332645 | A1 | * | 11/2014 | Brooks | A01M 31/06 |
| | | | | | 248/156 |
| 2016/0199678 | A1 | * | 7/2016 | Tsai | C08G 18/6674 |
| | | | | | 248/636 |
| 2016/0363186 | A1 | * | 12/2016 | McCoy | F16F 7/09 |
| 2017/0128756 | A1 | * | 5/2017 | Schurian | A62B 35/04 |
| 2017/0247894 | A1 | * | 8/2017 | Sargent | A62B 35/04 |
| 2018/0209504 | A1 | * | 7/2018 | Kim | F16F 3/02 |
| 2018/0264297 | A1 | * | 9/2018 | Poldmaa | F16F 7/003 |
| 2018/0323489 | A1 | * | 11/2018 | Vermillion, Jr. | H01Q 1/281 |
| 2019/0176733 | A1 | * | 6/2019 | Abushawashi | B62D 21/157 |
| 2019/0195310 | A1 | | 6/2019 | Carroccia | |
| 2019/0234480 | A1 | * | 8/2019 | Bu | F16F 15/022 |
| 2019/0301662 | A1 | * | 10/2019 | Brooks | A01K 39/01 |
| 2019/0337046 | A1 | * | 11/2019 | Sugita | B21F 3/06 |
| 2020/0070870 | A1 | * | 3/2020 | Terada | B62D 3/126 |
| 2021/0190164 | A1 | * | 6/2021 | Muraguchi | F16F 1/127 |

* cited by examiner

118

100

FORCE DAMPER

CROSS-REFERENCE TO RELATED APPLICATIONS

This application is a divisional of U.S. patent application Ser. No. 16/784,939, filed Feb. 7, 2020, which application is a continuation-in-part of U.S. patent application Ser. No. 16/113,618, filed Aug. 27, 2018, which application claims the benefit under 35 U.S.C. § 119(e) of U.S. Provisional Patent Application No. 62/610,786, filed Dec. 27, 2017, each of which applications are incorporated herein by reference.

FIELD

The invention broadly relates to a force damper, more specifically to a force damper used as a fall mitigation device, and even more particularly to a force damper used as a fall mitigation device having a single use, collapsible/compressible/compactable resilient member arranged to prevent reuse of the force damper after arresting a falling object, e.g., a roofing construction worker.

BACKGROUND

Fall prevention and fall arrest systems are known in the art. For example, one such system includes a stretchable shock absorbing lanyard, e.g., Model No. 1340101 PRO™ Stretch Shock Absorbing Lanyard manufactured by Protecta®. The inner core of the device extends from about four and a half feet to about six feet while absorbing energy of a falling object. Although this device may be suitable in some situations, it cannot ensure safety in situations where the falling height is similar to the height of the object falling, e.g., a worker that is six feet falling off an elevated level of seven feet. However, heretofore, such damper devices were arranged to be reused over and over again.

Regulations and/or a desire to ensure worker safety have created a need for force damping systems that cannot be used more than a single time as the integrity of a previously used force damper cannot be verified. For example, a force damper used to slow the fall of a three hundred pound object may not perform effectively while slowing the fall of a three hundred pound object a second time, while the same force damper may perform repeatably when slowing the fall of a one hundred fifty pound object. Thus, there is a long-felt need for a force damper that is easy to operate, inexpensive to build, safe for its intended use and that precludes subsequent uses.

SUMMARY

The present invention broadly comprises a force damper arranged to progressively arrest a first force imparted by an object moving in a first direction, the force damper including a housing, a driving member and a resilient member. The housing includes a first end and a second end, the first end having a first surface, a second surface opposite the first surface and a first connection point secured to the first surface, and the second end having a through bore and a third surface opposingly disposed relative to the second surface. The driving member includes a first end, a second end and a shaft therebetween, the first end comprises a stop and the second end comprises a second connection point. The resilient member is formed from a material that at least partially undergoes plastic deformation when the first force is arrested. The resilient member is disposed between the stop and the third surface and imparts a second force on the stop toward the second surface.

The present invention also broadly comprises a force damper arranged to progressively arrest a first force imparted by an object moving in a first direction, the force damper including a housing, a driving member and first and second resilient members. The housing includes a first end and a second end, the first end having a first surface, a second surface opposite the first surface and a first connection point secured to the first surface, and the second end having a through bore and a third surface opposingly disposed relative to the second surface. The driving member includes a first end, a second end and a shaft therebetween, the first end having a stop and the second end having a second connection point. At least one of the first and second resilient members is formed from a material that at least partially undergoes plastic deformation when the first force is arrested. The first and second resilient members are disposed between the stop and the third surface and impart a second force on the stop toward the second surface.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

Figure 1:
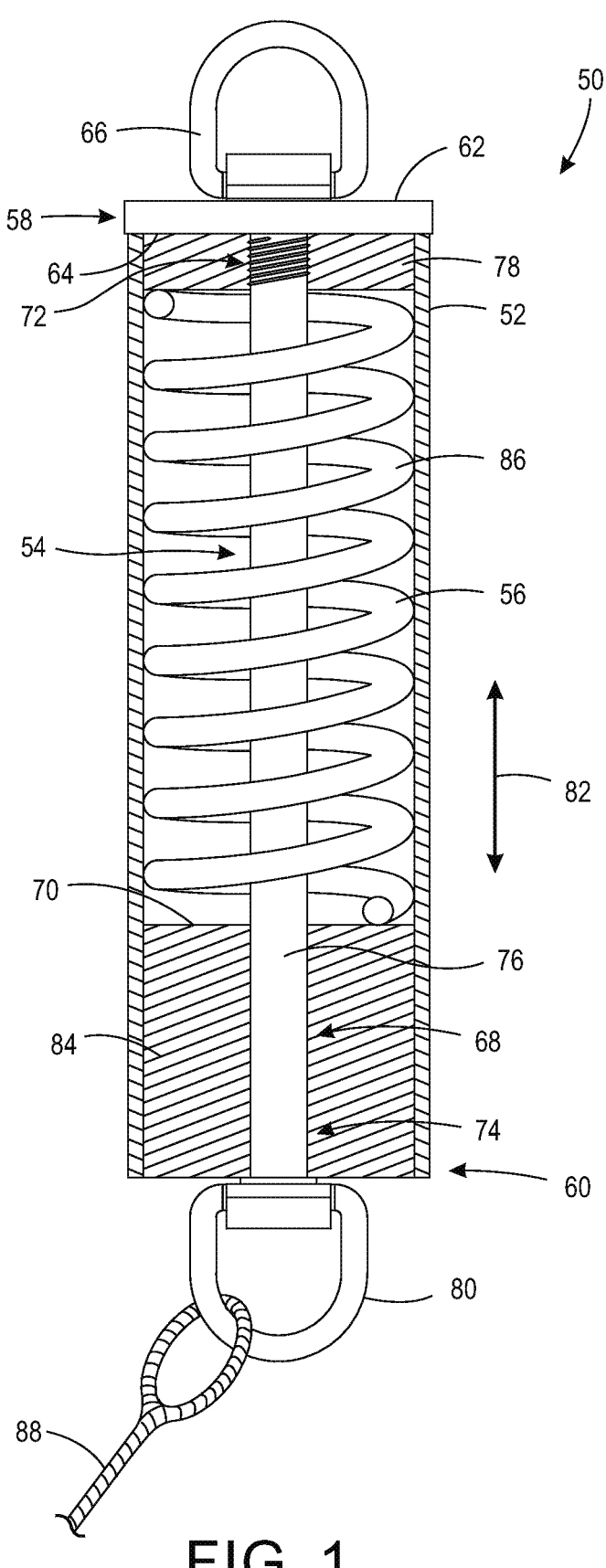
FIG. 1 is a side cross sectional view of an embodiment of a present force damper.
Figure 2:
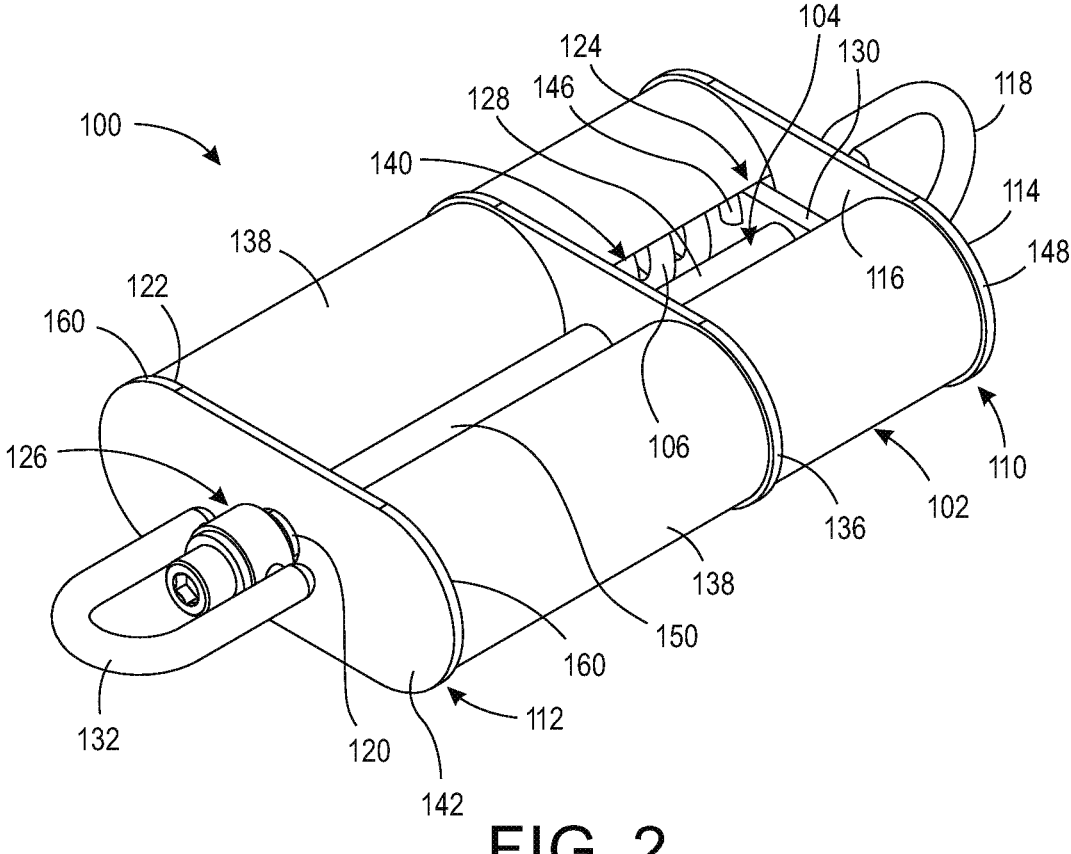
FIG. 2 is a top perspective view of an embodiment of a present force damper.
Figure 3:
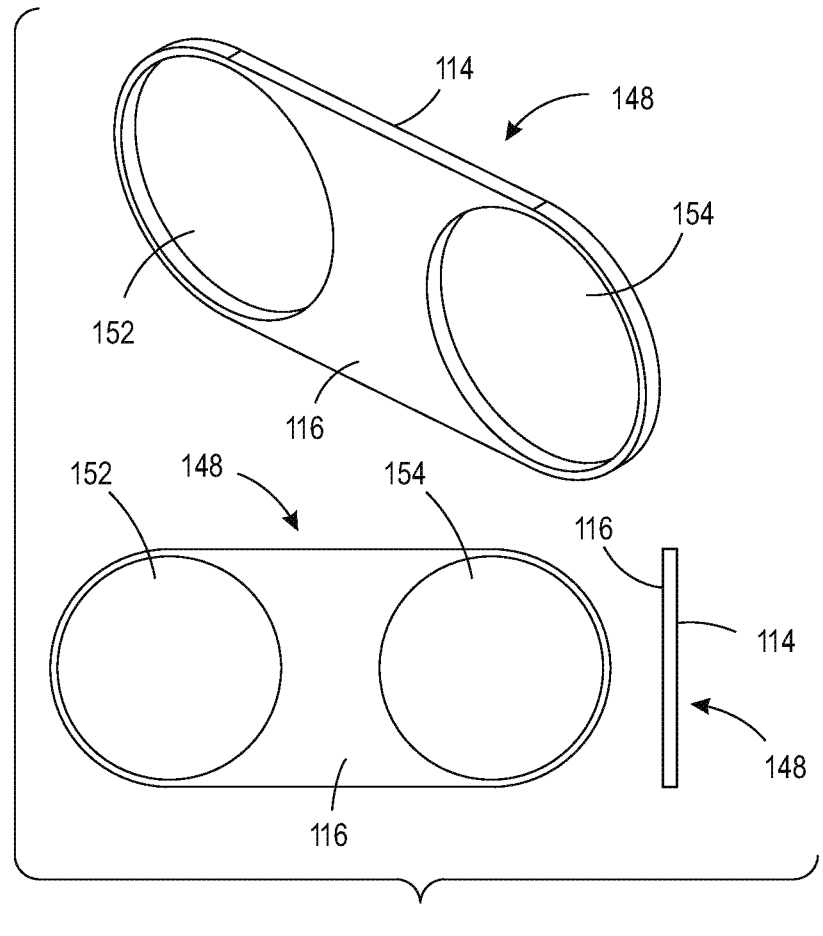
FIG. 3 is a front perspective, a side elevational and a front elevational view of an embodiment of a plate included in some embodiments of a present force damper.
Figures 4, 5:
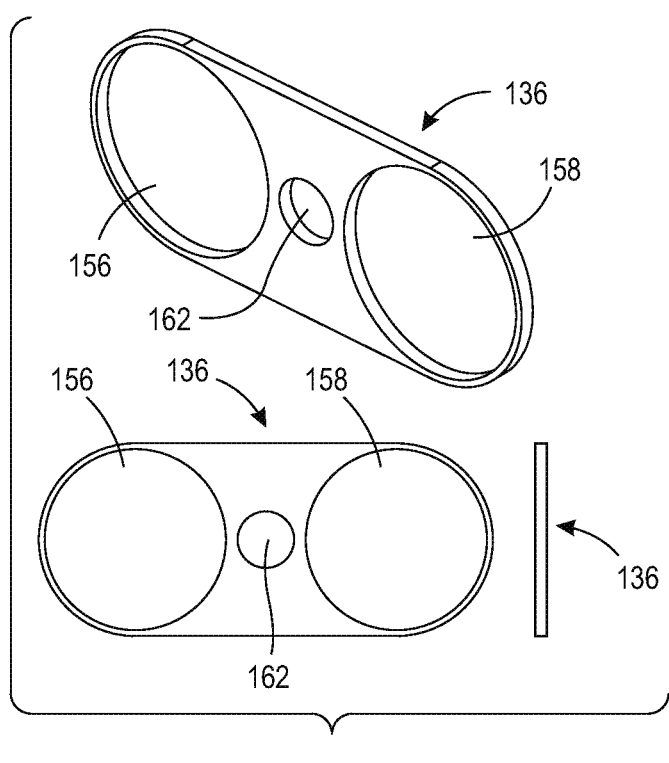
FIG. 4 is a front perspective, a side elevational and a front elevational view of an embodiment of a plate included in some embodiments of a present force damper.
FIG. 5 is a front perspective, a side elevational and a front elevational view of an embodiment of a plate included in some embodiments of a present force damper.
Figure 6:
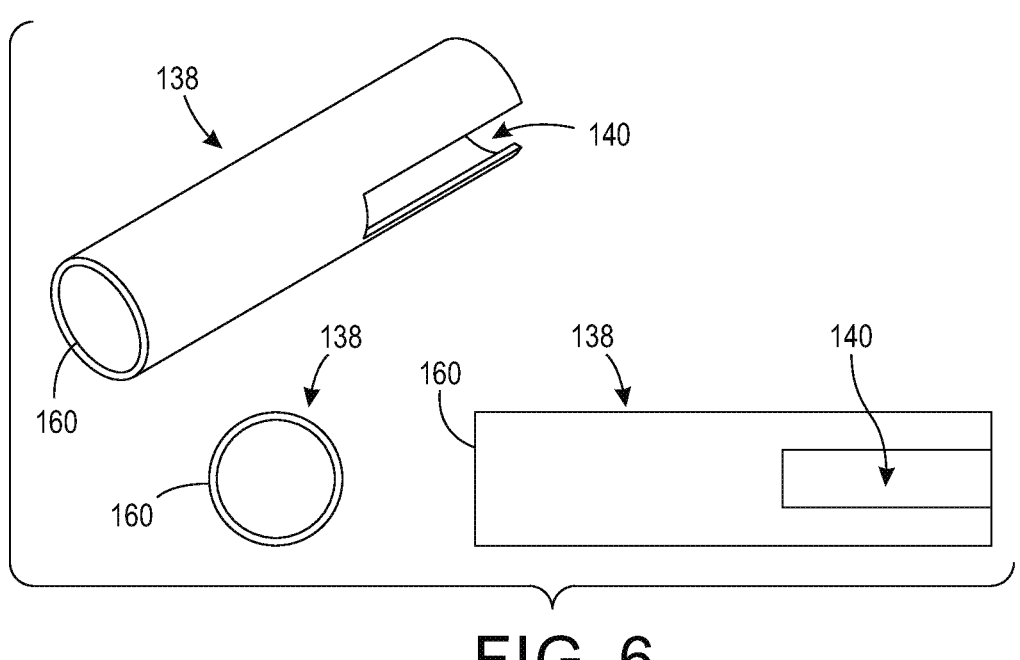
FIG. 6 is a front perspective, a side elevational and a front elevational view of an embodiment of a tube included in some embodiments of a present force damper.
Figure 7:
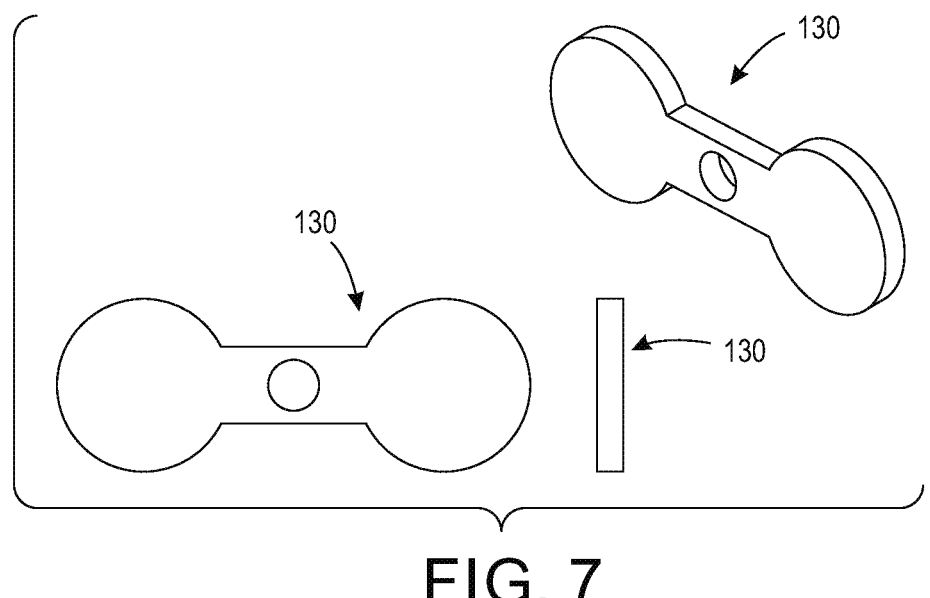
FIG. 7 is a front perspective, a side elevational and a front elevational view of an embodiment of a stop included in some embodiments of a present force damper.
Figure 8:
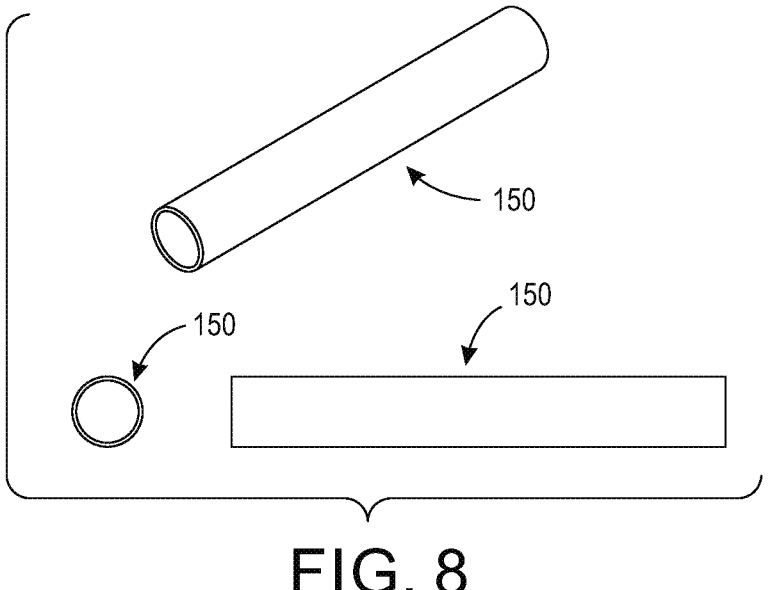
FIG. 8 is a front perspective, a side elevational and a front elevational view of an embodiment of a tube included in some embodiments of a present force damper.
Figure 9:
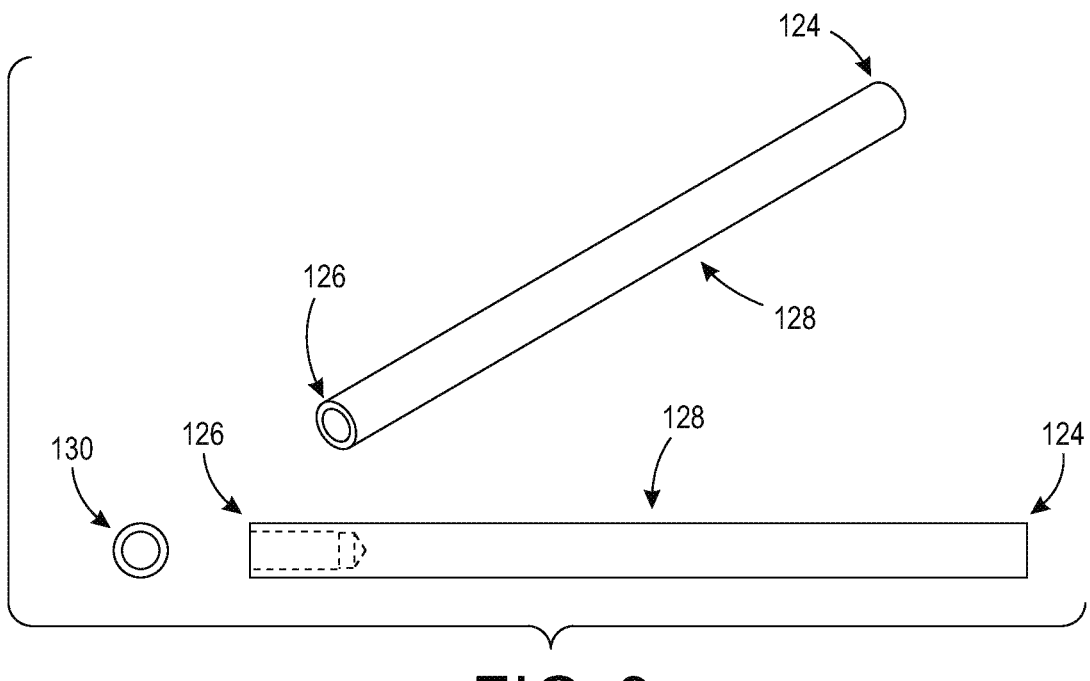
FIG. 9 is a front perspective, a side elevational and a front elevational view of an embodiment of a shaft included in some embodiments of a present force damper.
Figure 10:
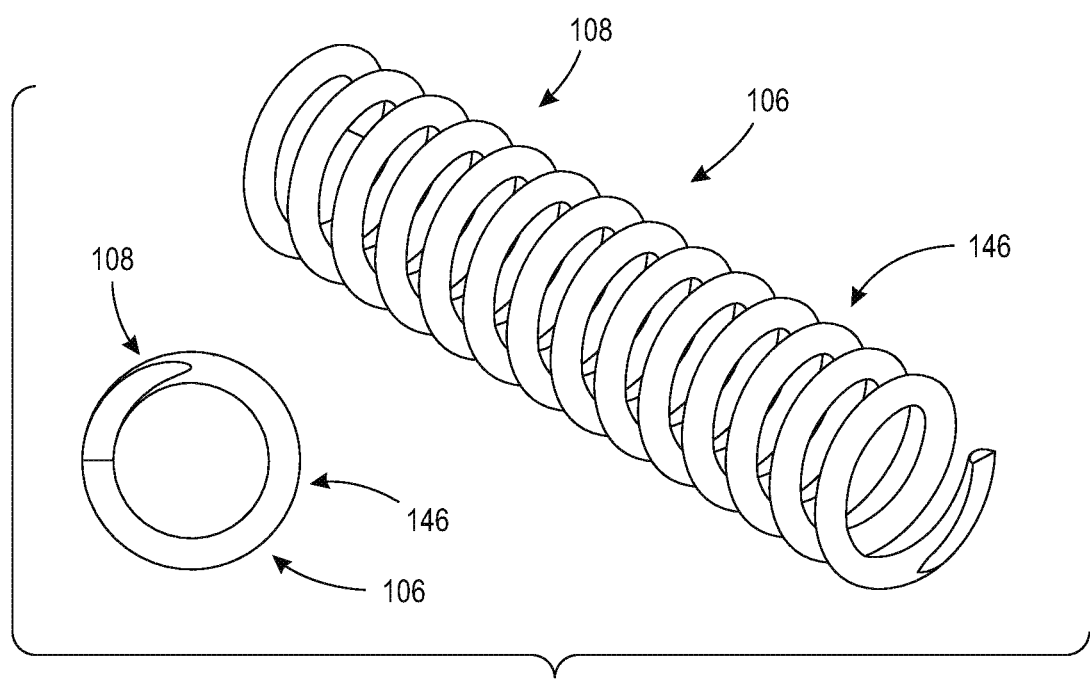
FIG. 10 is a front perspective and a front elevational view of an embodiment of a resilient member included in some embodiments of a present force damper.
Figure 11:
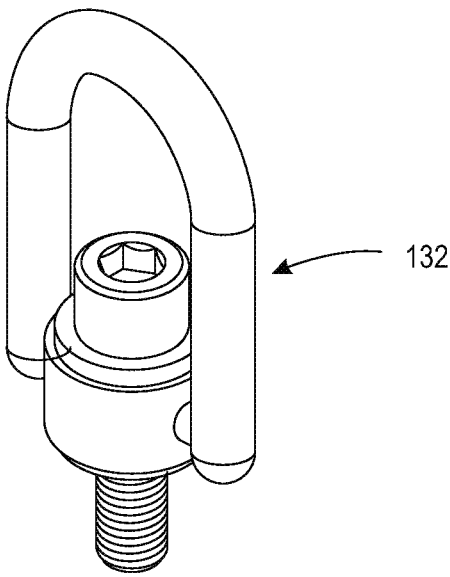
FIG. 11 is a front perspective view of an embodiment of a connection point included in some embodiments of a present force damper.
Figure 12:
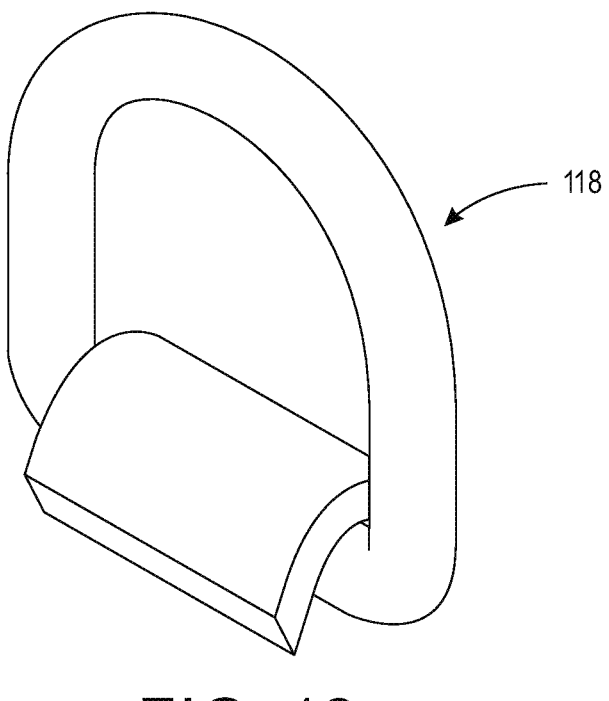
FIG. 12 is a front perspective view of an embodiment of a connection point included in some embodiments of a present force damper.
Figure 13:
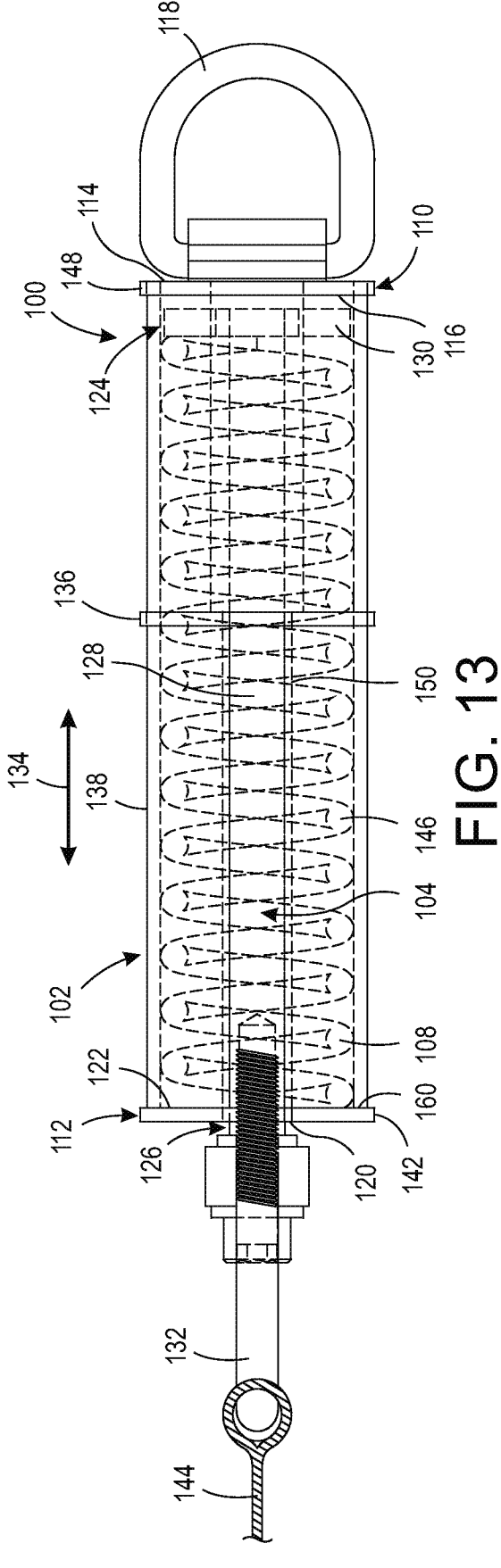
FIG. 13 is a side cross sectional view of an embodiment of a present force damper.
Figure 14:
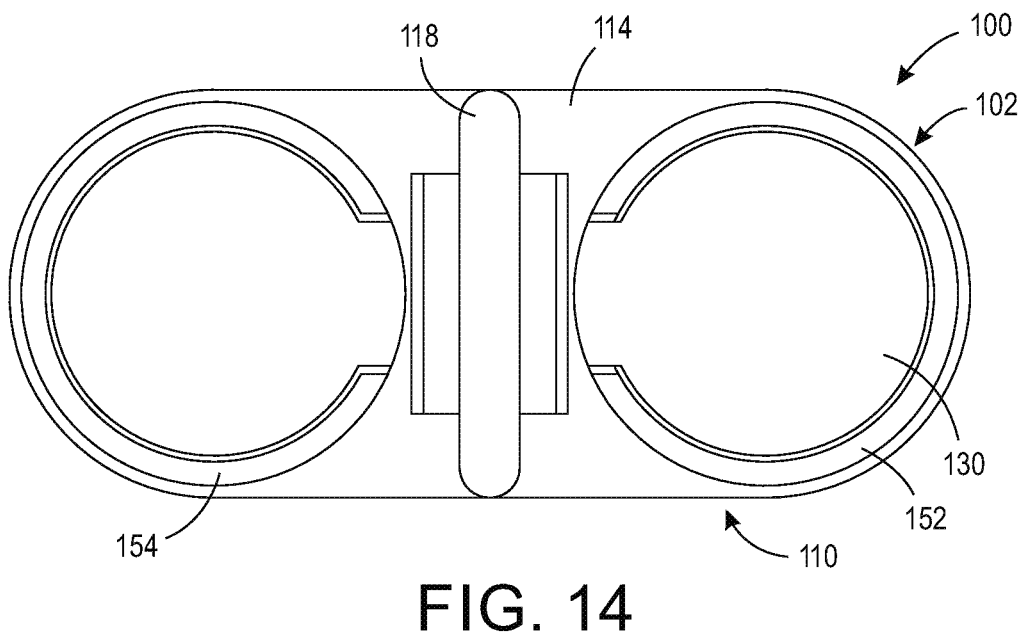
FIG. 14 is a front elevational view of an embodiment of a present force damper.
Figure 15:
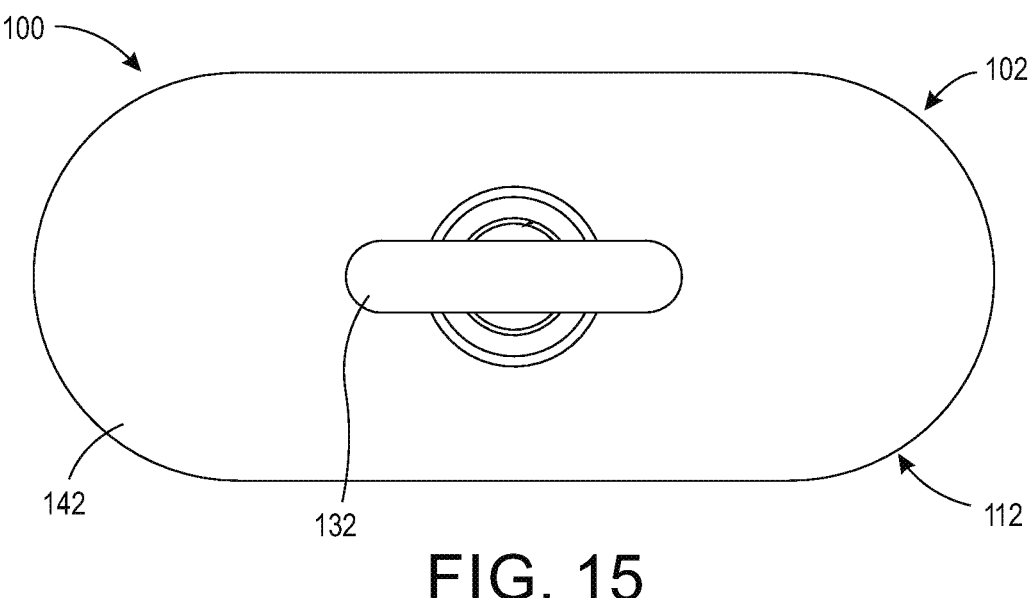
FIG. 15 is a back elevational view of an embodiment of a present force damper.
Figure 16:
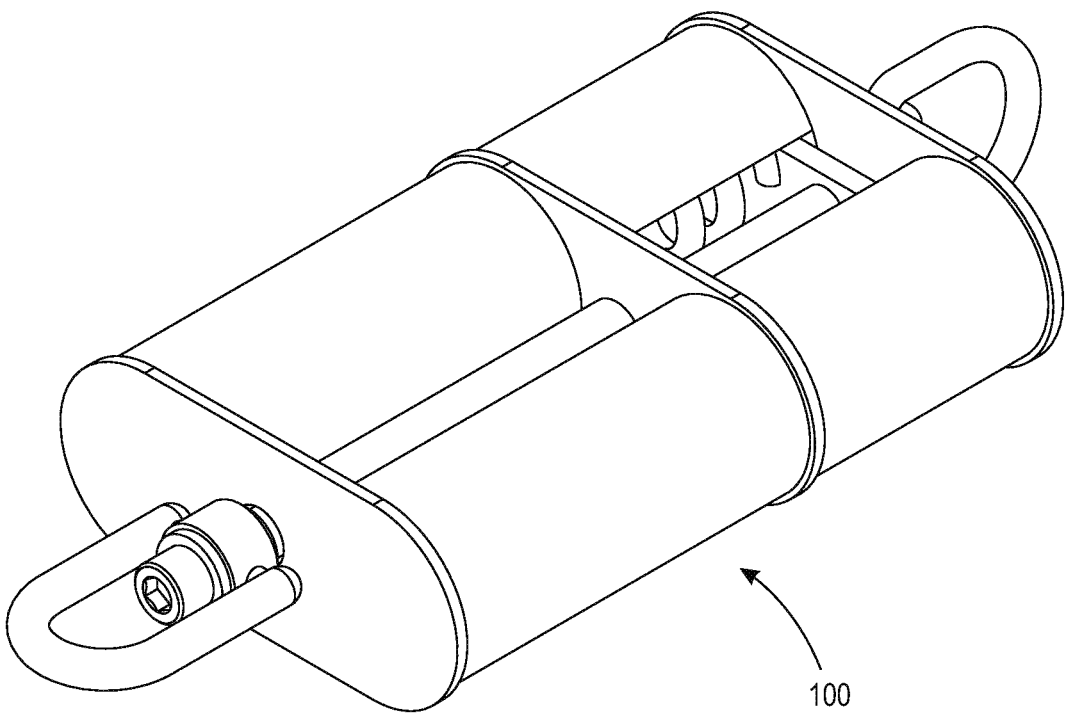
FIG. 16 is a top perspective view of an embodiment of a present force damper.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodologies, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

It should be appreciated that the term "substantially" is synonymous with terms such as "nearly," "very nearly," "about," "approximately," "around," "bordering on," "close to," "essentially," "in the neighborhood of," "in the vicinity of" etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required. Additionally, "plastic deformation" is intended to mean instances when a sufficient load is applied to a material that causes a permanent change in shape to that material.

Adverting now to the figures, it should be appreciated that the figures depict various embodiments of the present force damper. The elevated work surface, e.g., roof, the falling object, e.g., a worker, a tool, a container filled with materials, etc., are not shown in the figures. One of ordinary skill in the art will readily appreciate the type, form and arrangement of each of the foregoing structures and therefore depiction in the figures is unnecessary. For the purpose of clarity in the detailed description, these structures are not included in the figures; however, the structures are discussed herebelow.

The present invention broadly includes force damper 50 arranged to progressively arrest a first force imparted by an object moving in a first direction, i.e., the direction depicted by arrow 51. Force damper 50 comprises housing 52, driving member 54 and resilient member 56. Housing 52 comprises first end 58 and second end 60. First end 58 includes first surface 62, second surface 64 opposite first surface 62 and first connection point 66 secured to first surface 62. Second end 60 includes through bore 68 and third surface 70 opposingly disposed relative to second surface 64. Driving member 54 comprises first end 72, a second end 74 and shaft 76 therebetween. First end 72 comprises stop 78 and second end 74 comprises second connection point 80. Resilient member 56 is formed from a material that at least partially undergoes plastic deformation when the first force is arrested. Resilient member 56 is disposed between stop 78 and third surface 70 and imparts a second force on stop 78 toward second surface 64 and on second end 60 toward third surface 70, as depicted by bi-directional arrow 82.

In some embodiments, housing 52 encloses resilient member 56. In some embodiments, second end 60 of housing 52 comprises block 84. Block 84 comprises through bore 68 and third surface 70. In some of these embodiments, block 84 is formed from a urethane material. Thus, block 84 may provide force damping in addition to that of resilient member 56. It should be appreciated that block 84 may also be formed from a rigid material, e.g., a metal, and in those embodiments block 84 does not provide additional force damping.

In some embodiments, resilient member 56 is a resilient polymer, a leaf collapsible, a shock absorber, and/or a compression spring, e.g., compression spring 86. In some of these embodiments, resilient member 56 is compression spring 86, and in some of these embodiments, compression spring 86 is formed from a chrome silicon steel material. In some embodiments, the compression springs described herein are between 4-12". In some embodiments, the compression springs described herein may be formed from elastomeric compounds such as elastomeric plastics, etc.

In some embodiments, force damper 50 further comprises securing line 88 selected from the group of: a rope, a cable, and/or a tether, and securing line 88 may in turn be connected to a harness and/or a belt. Subsequently, the object to be secured, e.g., a worker, a tool, a container, etc., is secured directly to the rope, cable and/or tether, or alternatively, secured directly to the harness and/or belt. It should be appreciated that securing line 88 is depicted as a rope only and that the structure and form of a cable and/or a tether are readily apparent to one having ordinary skill in the art and therefore depiction in the figures is unnecessary. Similarly, depiction of a subsequent harness and/or belt is also unnecessary. It should be further appreciated that various types of securing lines are more suitable for the present force damper, e.g., stretchable and/or shock absorbing ropes, as additional force may be damped by these types of securing lines. However, including such types of securing lines is not required.

In other embodiments, the present invention broadly includes force damper 100 arranged to progressively arrest a first force imparted by an object moving in a first direction, i.e., the direction depicted by arrow 101. Force damper 100 comprises housing 102, driving member 104 and first and second resilient members 106 and 108, respectively. Housing 102 comprises first end 110 and second end 112. First end 110 includes first surface 114, second surface 116 opposite first surface 114 and first connection point 118 secured to first surface 114. Second end 112 includes through bore 120 and third surface 122 opposingly disposed relative to second surface 116. Driving member 104 comprises first end 124, second end 126 and shaft 128 therebetween. First end 124 comprises stop 130 and second end 126 comprises second connection point 132. At least one of first and second resilient members 106 and 108, respectively, is formed from a material that at least partially undergoes plastic deformation when the first force is arrested. In other terms, one or both of first and second resilient members 106 and 108, respectively, undergoes plastic deformation while arresting the first force. Thus, one of the resilient members may be arranged to arrest a portion of the force and display visible, permanent deformation while the other resilient member provides force damping while undergoing only elastic deformation, i.e., temporary shape change with restoration to its original shape after damping is complete. First and second resilient members 106 and 108, respectively, are disposed between stop 130 and third surface 122, and impart a second force on stop 130 toward second surface 116 and on second end 112 toward third surface 122, as depicted by bi-directional arrow 134.

In some embodiments, housing 102 further comprises reinforcement plate 136 arranged between first and second ends 110 and 112, respectively, of housing 102. In some embodiments, housing 102 at least partially encloses first and second resilient members 106 and 108, respectively. It should be appreciated that "partially encloses" is depicted in the figures in that tubes 138 include open portions 140 which permit the linear actuation of stop 130 as force damper 100 arrests the first force imparted by the object moving in the first direction. In some embodiments, second end 112 of housing 102 comprises plate 142. Plate 142 comprises through bore 120. In some embodiments, force damper 100 further comprises securing line 144 selected from the group of: a rope, a cable, and/or a tether, and securing line 144 may in turn be connected to a harness and/or a belt. Subsequently, the object to be secured, e.g., a worker, a tool, a container, etc., is secured directly to the rope, cable and/or tether, or alternatively, secured directly to the harness and/or belt. It should be appreciated that securing line 144 is depicted as a rope only and that the structure and form of a cable and/or a tether are readily apparent to one having ordinary skill in the art and therefore depiction in the figures is unnecessary. Similarly, depiction of a subsequent harness and/or belt is also unnecessary. It should be further appreciated that various types of securing lines are more suitable for the present force damper, e.g., stretchable and/or shock absorbing ropes, as additional force may be damped by these types of securing lines. However, including such types of securing lines is not required.

In some embodiments, stop 130 extends perpendicularly from shaft 128 towards first and second resilient members 106 and 108, respectively. As such, it should be appreciated that stop 130 is positioned between first and second resilient members 106 and 108, respectively, and second surface 116.

In some embodiments, first and second resilient members 106 and 108, respectively, are formed from a resilient polymer, a leaf spring, a shock absorber, and/or a compression spring, e.g., compression spring 146. In some of these embodiments, resilient members 106 and 108 are compression spring 146, and in some of these embodiments, compression spring 146 is formed from a chrome silicon steel material. In some embodiments, the compression springs described herein are between 4-12". In some embodiments, the compression springs described herein may be formed from elastomeric compounds such as elastomeric plastics, etc.

Although the foregoing clearly sets forth the structure and function of various embodiments of the present force damper, a further description of the components of one of the embodiments may be helpful to further understand how the device functions. In various embodiments, force damper 100 may include a variety of additional components and such components are not required in all embodiments. However, it should be appreciated that it is possible to include all or some of the components described below in a single embodiment if desired.

In view of the foregoing, force damper 100 may include plate 148, reinforcement plate 136, plate 142, tubes 138, stop 130, tube 150, shaft 128, resilient members 106 and 108, and connection points 118 and 132. When all of the foregoing components are included in force damper 100, the following non-limiting arrangement is just one of the possibilities. Tubes 138 partially enclose resilient members 106 and 108. Tubes 138 are passed through openings 152 and 154 in plate 148 and subsequently through openings 156 and 158 in reinforcement plate 136 until ends 160 of tubes 138 abut plate 142. Connection point 118 is fixedly secured to plate 148. Stop 130, which is secured to end 124 of shaft 128, is positioned within openings 140 of tubes 138 and between resilient members 106 and 108 and plate 148. The foregoing arrangement permits the linear movement of stop 130 against resilient members 106 and 108 when force damper 100 is arresting a first force imparted by an object moving in a first direction. Reinforcement plate 136 may further include opening 162 wherein tube 150 is passed until it abuts plate 142. Tube 150 provides an unrestricted passage for shaft 128 during its linear displacement. Moreover, the combination of reinforcement plate 136, tube 150 and plate 142 strengthens the overall structure of force damper 100. Plate 142 may include through bore 120 adjacent to the abutment of tube 150. Through bore 120 provides access to second end 126 of shaft 128 and thereby a means to secure connection point 132 to shaft 128. As can be appreciated in view of the foregoing, the pathway of force through the device is: connection point 118 to plate 148 to tubes 138 to plate 142 to resilient members 106 and 108 to stop 130 to shaft 128 to connection point 132. It is this arrangement that permits the damping of force between connection points 118 and 132, in this particular embodiment.

The foregoing arrangement results in a force damper that solves problems presented by regulatory agencies and worker safety concerns, i.e., a force damper in a fall miti- gation system should only be used one time. The foregoing embodiments provide force damping over a reduced range of travel, e.g., the present force damper travels approxi- mately three to six inches while absorbing the force of a falling object. Heretofore, existing force damping systems required far greater distance to damp the force of a falling object, e.g., two and a half to three feet. It should be appreciated that the present force damper system may be configured to travel lesser or greater lengths depending on the needs of the system. All the various resilient members described above may provide some elastic deformation, the resilient members are selected for particular falling masses that will always impart plastic deformation on at least one of the resilient members while they arrest a first force imparted by an object moving in a first direction. For example, one set of resilient members may be rated for arresting the force created by a falling object ranging from 100 kilograms (kg) to 150 kg, while a different set of resilient members may be rated for falling objects ranging from 150 kg to 200 kg. It is critical that at least one of the resilient members experiences plastic deformation so that single use of each the devices can be ensured. The plastic deformation of at least one of the resilient members with no return to its original shape/size provides a readily observable characteristic of the present force damper that ensures a user of the device can determine if it has been previously used for its intended purpose, i.e., arresting the force created by an object moving in a first direction.

Referring now to FIGS. 17-24, further present embodi- ments of a force damper can include, for example, one or more resilient members used in association with a so-called Belleville washer having a frustoconical shape, driving member shafts including zig-zag-like, sinusoidal-like, or helical-like portions that may be elongated and plastically deformed upon application of a force to thereby attenuate the force applied thereto, or so-called compressible/collaps- ible/compactible crumple zones configured to be compressed/collapsed/compacted to thereby absorb/attenuate a force applied to the driving member shaft. It should be appreciated that while FIGS. 17-24 primarily illustrate embodiments of a force damper comprising a single housing and single driving member, etc., such embodiments com- prise can more than a single housing and driving member shaft, and, for example, may comprise so-called dual-hous- ing type embodiments.

Figure 17:
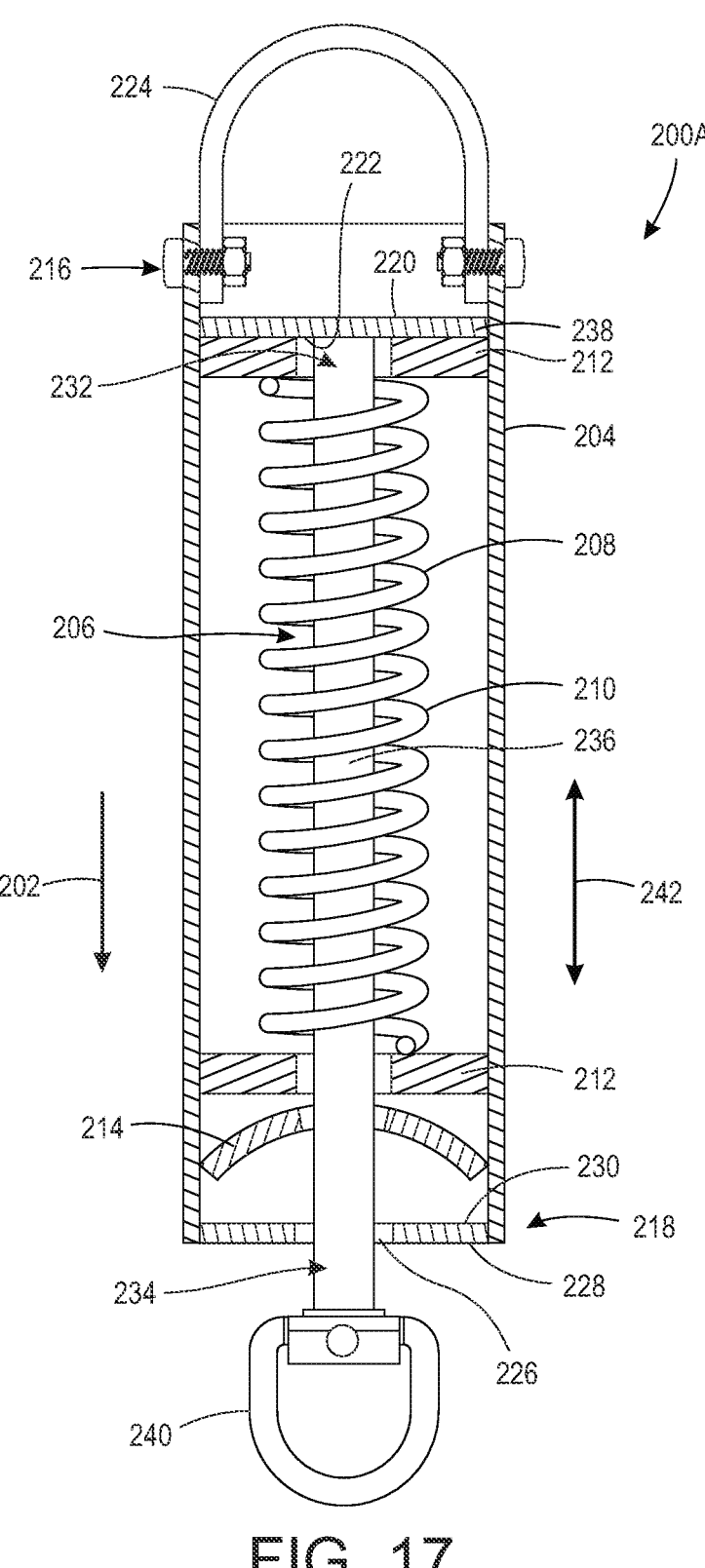
FIG. 17 is a side cross sectional view of an embodiment of a present force damper.

As shown in FIG. 17, for example, force damper 200A is arranged to progressively arrest a first force imparted by an object moving in a first direction, i.e., the direction depicted by arrow 202. Force damper 200A comprises housing 204, driving member 206 and resilient member 208. Housing 204 comprises first end 216 and second end 218 and may be fabricated from materials such as steel, aluminum, other lightweight metals, fiberglass, carbon fiber, composites, or combinations thereof. First end 216 includes first surface 220, second surface 222 opposite first surface 220 and first connection point 224 connected to housing 204, for pur- poses of, for example, securing the force damper to a fixed structure or a fall arrest apparatus. Second end 218 includes through bore 226 and third surface 230 opposingly disposed relative to second surface 222. Driving member 206 com- prises first end 232, a second end 234 and driving member shaft 236 therebetween. First end 232 comprises driving member stop 238 and second end 234 comprises second connection point 240 for purposes of, for example, securing an object or person thereto by means of a rope, cable, webbing, lanyard, tear-away lanyard, etc. (not shown). Resilient member 208 is formed from a material that at least partially undergoes plastic deformation when the first force is arrested. Resilient member 208 is disposed between driving member stop 238 and third surface 230 of housing end wall 228 and imparts a second force on driving member stop 238 toward second surface 222 and on second end 218 toward third surface 230, as depicted by bi-directional arrow 242.

In some embodiments, housing 204 encloses resilient member 208. In some embodiments, one or more of first end 216 and second end 218 of housing 204 can comprise one or more semi-resilient members 212. Semi-resilient members 212 comprise a through bore allowing driving member shaft 236 to pass therethrough. In some of these embodiments, semi-resilient members 212 are formed from a urethane material which serves to further attenuate a force applied to the driving member 206. In some embodiments, semi- resilient member 212 is composed of 60 durometer urethane, or like compound, having a thickness between ⅜ and ½". Thus, semi-resilient members 212 may provide force damp- ing in addition to that of resilient member 208. In some embodiments, semi-resilient member 212, e.g. a urethane washer, can be configured to be less compressible/extend- able and/or resilient as compared to resilient member 208, e.g., a spring member, and can exhibit no deformation, exhibit partial deformation, or exhibit deformation when the first force is arrested, which deformation can be elastic or plastic deformation. As shown in FIG. 17, a force damper may further include a so-called Belleville washer 214, which is disposed within housing 204 between driving member stop 238 and end wall 228 of housing 204. Belleville washer 214 has a frustoconical shape and includes a through bore allowing the driving member shaft 236 to pass therethrough. Belleville washer 214 can be formed from a plastically deformable material with no return to its original shape/size, such as a metal, plastics, polymers, from sacrificial/fractur- able/frangible materials, or combinations thereof so as to provide a readily observable characteristic as to whether the force damper has been subject to prior use. Along this line, housing 204 may include a viewing window or slit proximate the location of Belleville washer 214 so to allow ready inspection thereof. It should be appreciated that while FIG. 17 illustrates Belleville washer 214 as being disposed between semi-resilient member 212 and end wall 228 of second end 218 of housing 204, it may be positioned otherwise within housing 204 and at any position between end wall 228 and driving member stop 238. In some cases, Belleville washer 214 can be formed of an elastically deformable material that returns to its original shape. Additionally, while FIG. 17 illustrates Belleville washer 214 being positioned such that its concave side is disposed toward end wall 218, it may be positioned such that its concave side is oppositely positioned toward driving member stop 238. Also, while only a single Belleville washer 214 is shown in FIG. 17, more than one Belleville washer 214 may be utilized depending upon the specific application, i.e., the object and/or the amount of force to be attenuated/arrested. Where more than one Belleville washer 214 is utilized, they may be positioned to contact one another in a stacked, or nested-type arrangement, positioned such that they contact one another but do not nest with one another, positioned in such a way that that they do not contact one another, e.g. on opposite ends of housing 204, or combinations thereof depending upon the specific application.

In some embodiments, resilient member 208 is a resilient polymer, a leaf spring, a shock absorber, and/or a compression spring, e.g., compression spring 210. In some of these embodiments, resilient member 208 is compression spring 210, and in some of these embodiments, compression spring 210 is formed from a chrome silicon steel material. In some embodiments, the compression springs described herein are between 4-12". In some embodiments, the compression springs described herein may be formed from elastomeric compounds such as elastomeric plastics, etc.

In some embodiments, force damper 220A further comprises a securing line (not shown) selected from the group of: rope, cable, webbing, tether, lanyard, tear-away lanyard, combinations thereof, etc., and the securing line may in turn be connected to a harness and/or a belt. Subsequently, the object to be secured, e.g., a worker, a tool, a container, etc., is secured directly to the securing line rope, cable and/or tether, or alternatively, secured directly to the harness and/or belt. It should be further appreciated that various types of securing lines may be more suitable for the present force damper, e.g., stretchable and/or shock absorbing ropes, tear away lanyards, as additional force may be damped by these types of securing lines. However, including such types of securing lines is not required.

As shown in FIGS. 18A-20, force dampers 200B-200D are substantially similar to force damper 220A, but are primarily different in that they can include differently configured driving member shafts 236, which are configured to be elongated upon application of a sufficient force in the first direction 202. That is, as force dampers 200A-200D include similar structural elements, discussion of such similar structural elements is not re-presented herein, and the following description is substantially limited to a discussion of the differences between embodiments 200A-200D.

As shown in FIGS. 18A-20 force dampers 200B-200D are generally configured to comprise plastically deformable and elongatable driving member shafts 236 including zig-zag/sinusoidal/helical-like portions 237 positioned between driving member first end 232 and driving member second end 234. As may be appreciated, in such embodiments, the driving member shaft 236 can be formed from a plastically deformable material that does not allow return to its original shape/size, such as a metal or certain polymers, from other sacrificial/non-reusable materials, or combinations thereof so as to provide a readily observable characteristic as to whether the force damper has been subject to prior use. As may be further appreciated, housing 204 may include a viewing window or slit proximate location of zig-zag/sinusoidal/helical-like portions 237 so to allow ready inspection thereof (not shown) such that operational state may be readily determined. In some aspects, however, driving member shafts 236 may be elastically deformable such that they substantially return to their original shapes.

Figure 18A:
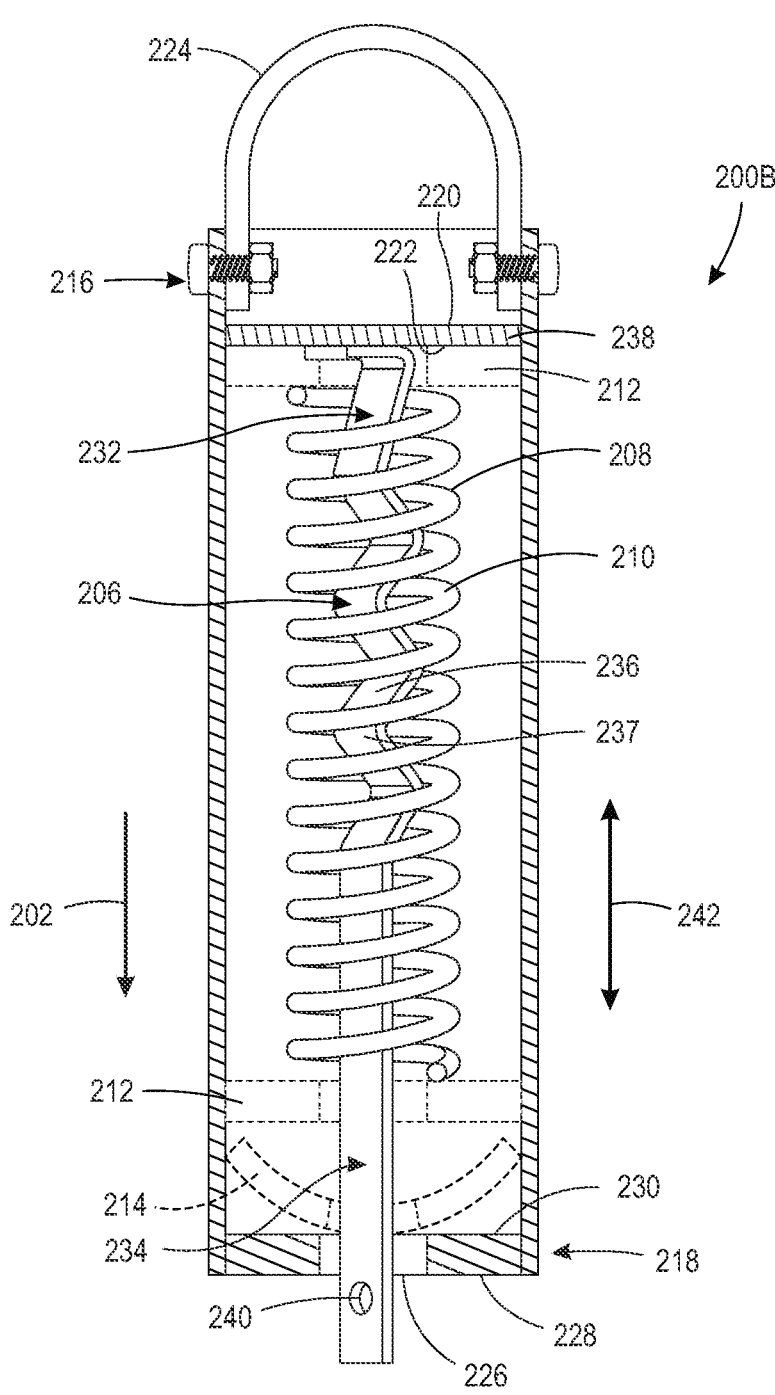
FIGS. 18A and 18B are side cross-sectional views of embodiments of a present force damper before (FIG. 18A) and after (FIG. 18B) application of a force upon a driving member shaft.
Figure 18B:
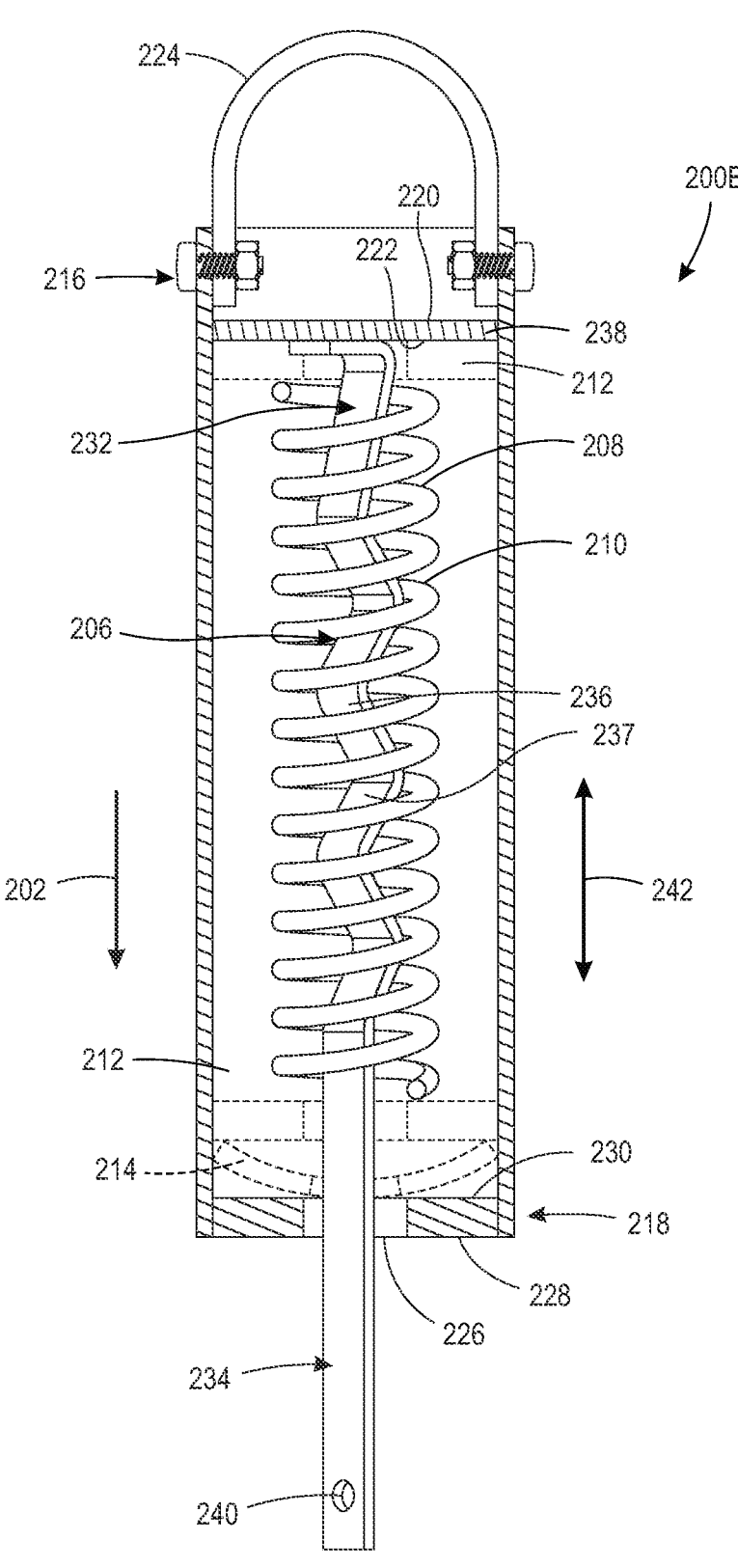
Figure 19:
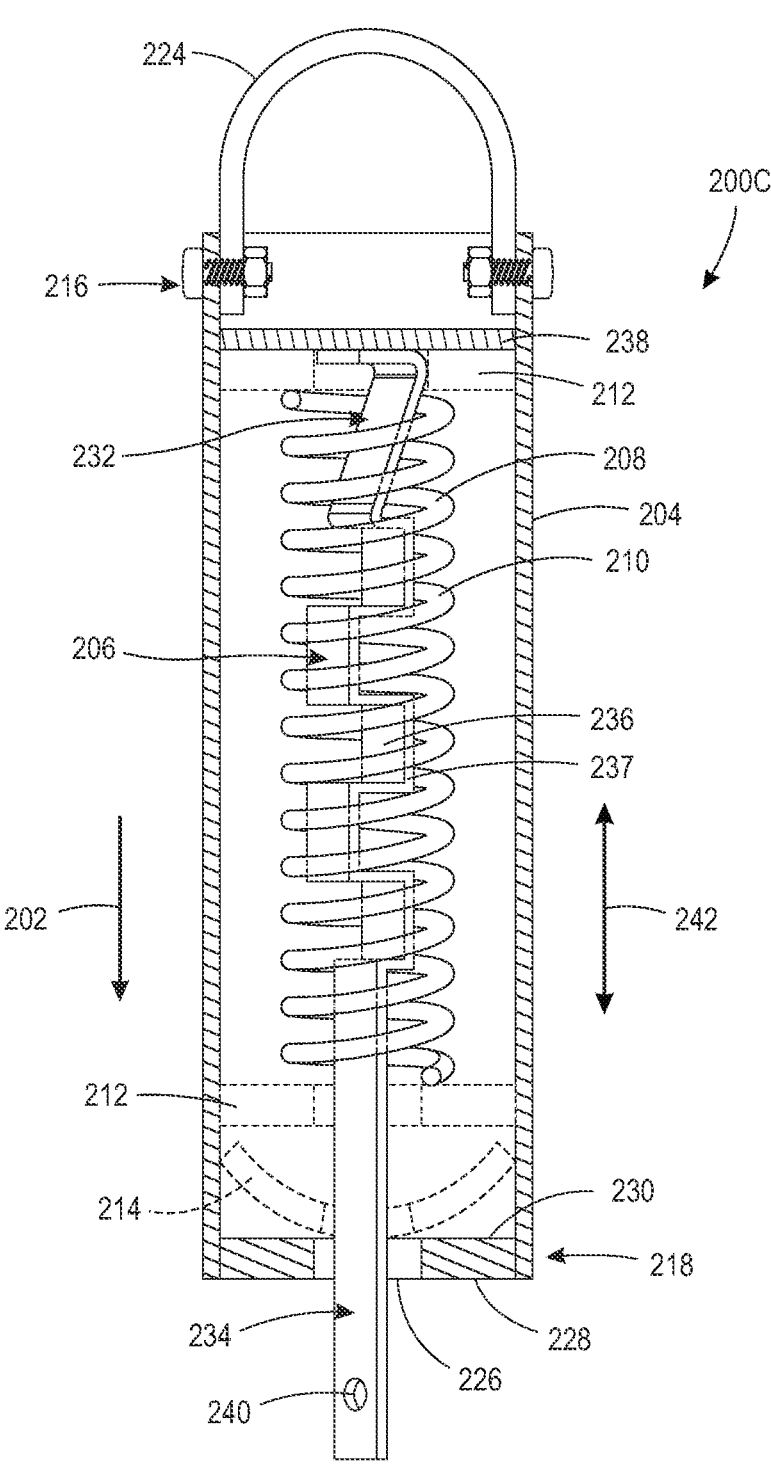
FIG. 19 is a side cross sectional view of an embodiment of a present force damper.
Figure 20:
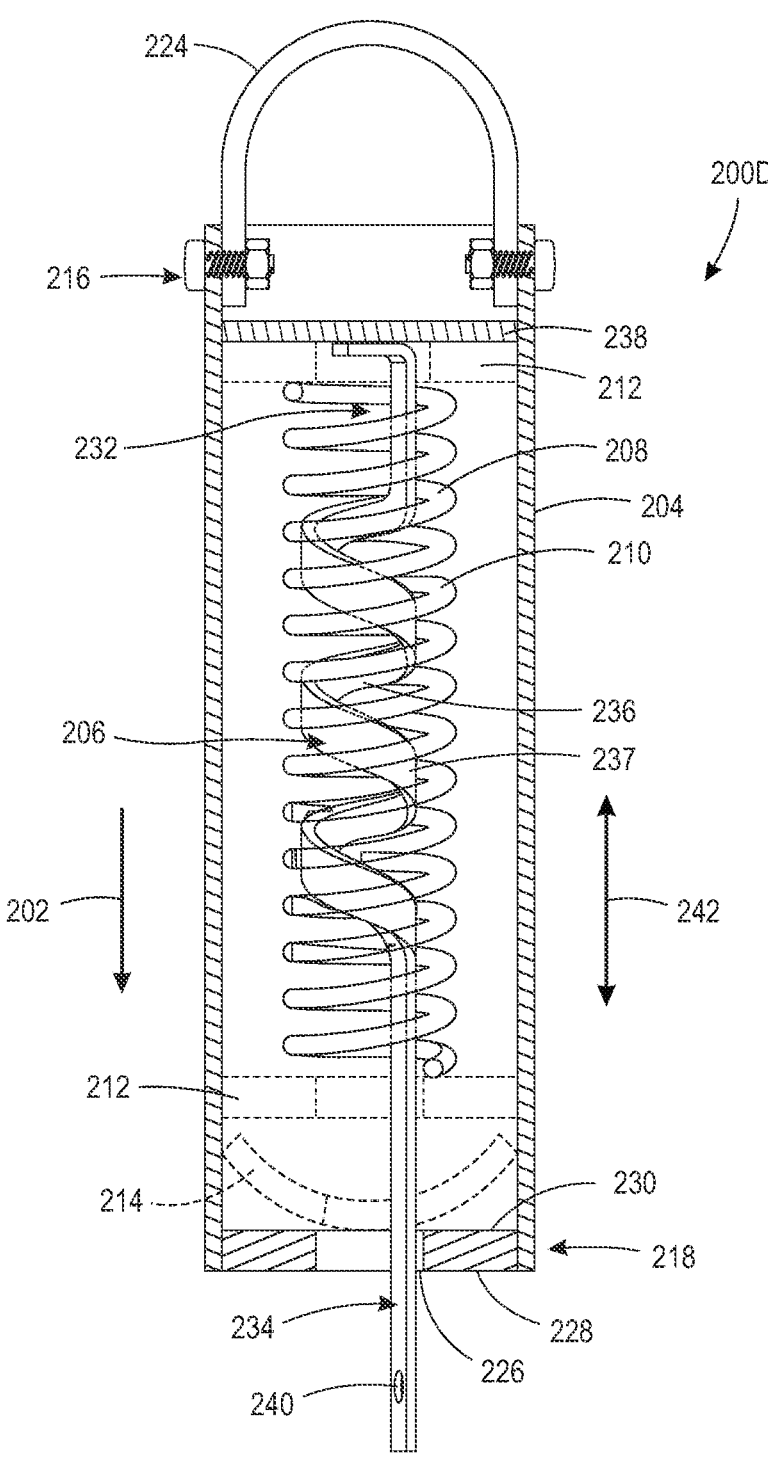
FIG. 20 is a side cross sectional view of an embodiment of a present force damper.

As also shown in FIGS. 18A-20, in the case of plastically deformable driving member shafts, the driving member shafts 236 including zig-zag/sinusoidal/helical-like portions 237 can be formed from a generally flat stock and include zig-zag-like folded/pleated portions 237 in the case of FIGS. 18A and 18B, square sinusoidal-type portions 237 in the case of FIG. 19, and helical-type portions 237 in the case of FIG. 20. As may be appreciated from FIGS. 18A and 18B, for example, prior to a force being applied to driving member shaft 236 including zig-zag-like folded/pleated portions 237 in first direction 202, zig-zag-like folded/pleated portions 237 are maintained in a so-called start position. However, as shown in FIG. 18B, upon application of a sufficient force, zig-zag-like folded/pleated portions 237 become elongated and are plastically deformed at the ending position shown by way of example in FIG. 18B. Such elongation and plastic deformation serves to both further attenuate/dampen the force applied in the first direction, that may result from a falling object or person, and in the case of plastic deformation, also serves as an indicator that the force damper has been previously utilized. While not shown in any of FIGS. 18A-20, driving member shafts 236 including zig-zag-like folded/pleated portions 237 can also be configured to include, for example, markings, colored markings, knurling, etching, etc. along a length thereof, for example, proximate through bore 226 of housing, to show whether the force damper has been previously utilized and the driving member shafts 236 elongated and subject to plastic deformation. For example, where the force damper has not been utilized, a colored marking proximate through bore 226 could be green in color to show that the force damper remains available for use, or red to indicate that it has been previously used and should be discarded. Additionally, it should be further appreciated that driving member shafts 236 including zig-zag/sinusoidal/helical-like portions 237 can be formed of stock of varying thickness and/or varying number of folds/pleats/turns based on the particular application and/or object that is secured thereto. In some embodiments, the driving member shafts 236 are formed from ⅛" steel. Furthermore, as shown in FIGS. 18A-20, force dampers including driving member shafts 236 including zig-zag/sinusoidal/helical-like portions 237 can also optionally include semi-resilient members 212 and/or Belleville washers 214 (as shown by the dashed lines in such figures).

Figure 21A:
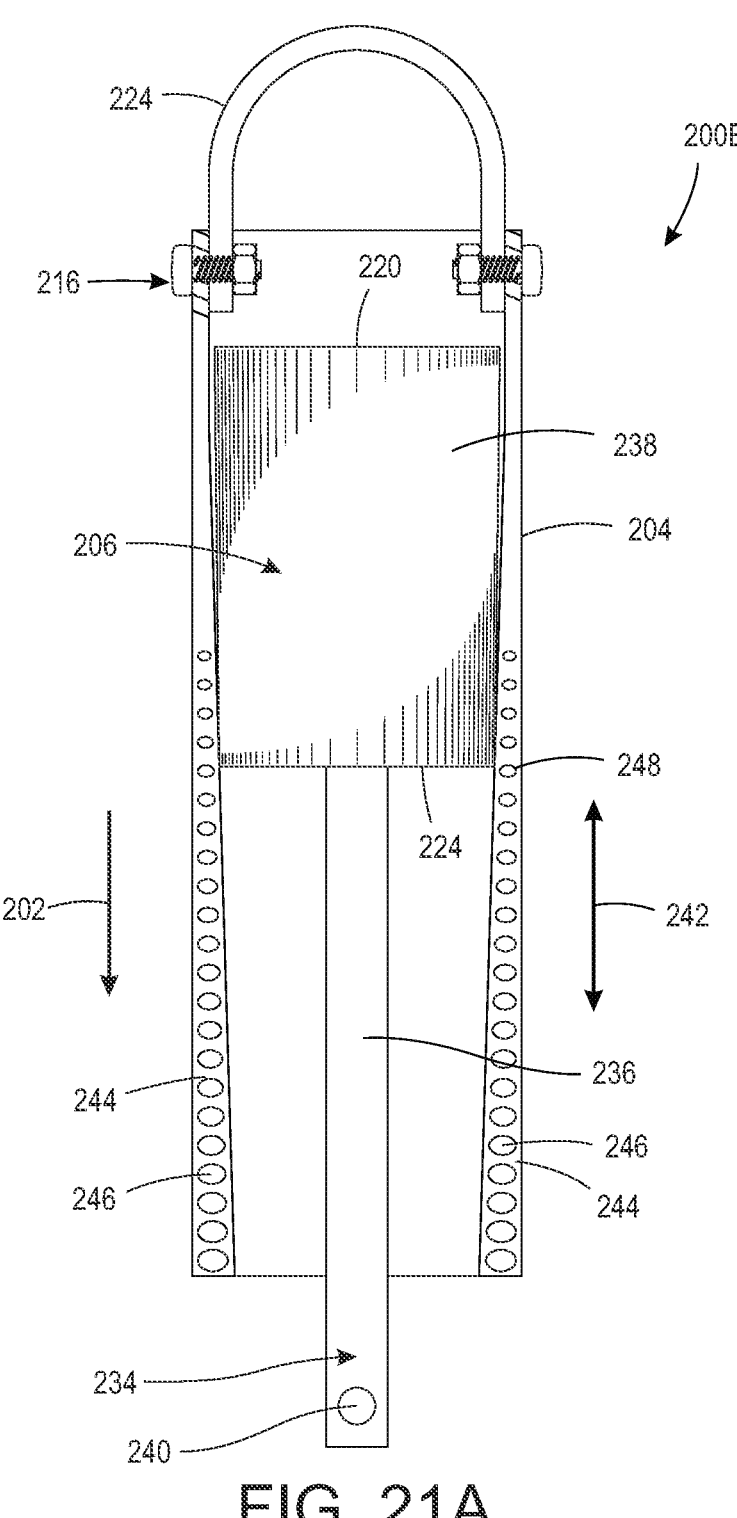
FIGS. 21A and 21B are side cross-sectional views of embodiments of a present force damper before (FIG. 21A) and after (FIG. 21B) application of a force upon a driving member shaft; and, FIGS. 22-24 are graphical representations of results of drop tests of present embodiments of force dampers described herein.
Figure 21B:
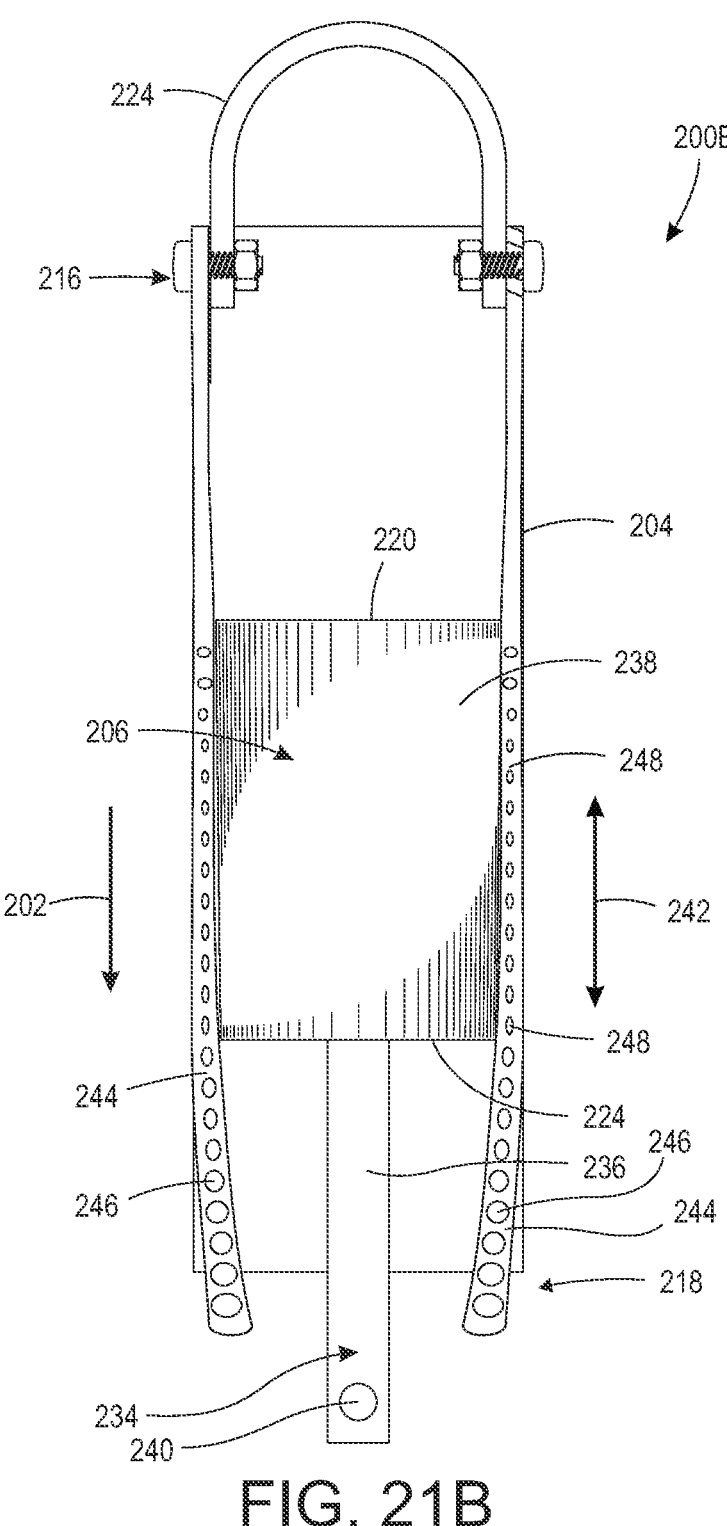

Turning now to FIGS. 21A and 21B, force damper 200E, and other embodiments of force dampers described herein, may be configured to comprise a so-called collapsible/compressible/compactable crush zone configured to reduce or attenuate the amount of force applied in first direction 202. As shown by way of example in FIGS. 21A and 21B, force damper 200E can be configured to include driving member 206 having a driving member stop 238 having a tapered shape for purposes of contacting a collapsible/compressible/compactable tapered wall 244 of housing 204. As shown in such figures, collapsible/compressible/compactable tapered wall 244 can include, for example, channels or interstitial portions 248 disposed between structural portions 244 thereof such that upon action by the tapered driving member stop 238, such walls may collapse/compress/compact upon themselves and/or may be partially directionally disposed toward second end 218 as shown in FIG. 21B. As may be appreciated, such so-called collapsible/compressible/compactable crush zones may be configured to comprise a structural member of the housing, e.g., a wall of the housing itself, or may be configured to comprise a member or zone secured, disposed on, or adhered to an inner wall of housing 204. As may be further appreciated, collapsible/compressible/compactable zone 244 may be formed of metals, polymers, foams, resilient materials, fracturable or frangible materials, or combinations thereof. Additionally, while FIGS. 21A and 21B illustrate a force damper as comprising a so-called collapsible/compressible/compactable crush zone only, such zones may be used in association with one or more of the force damper embodiments or aspects thereof previously discussed herein. Walls of the housing and/or tapered wall 244 may also be configured in a stepped fashion, for example, to ensure that a collapsible/compressible/compactable member or zone secured, disposed on, or adhered to an inner wall of housing 204 is not dislodged as a result of the application of a force in the first direction.

Figure 22:
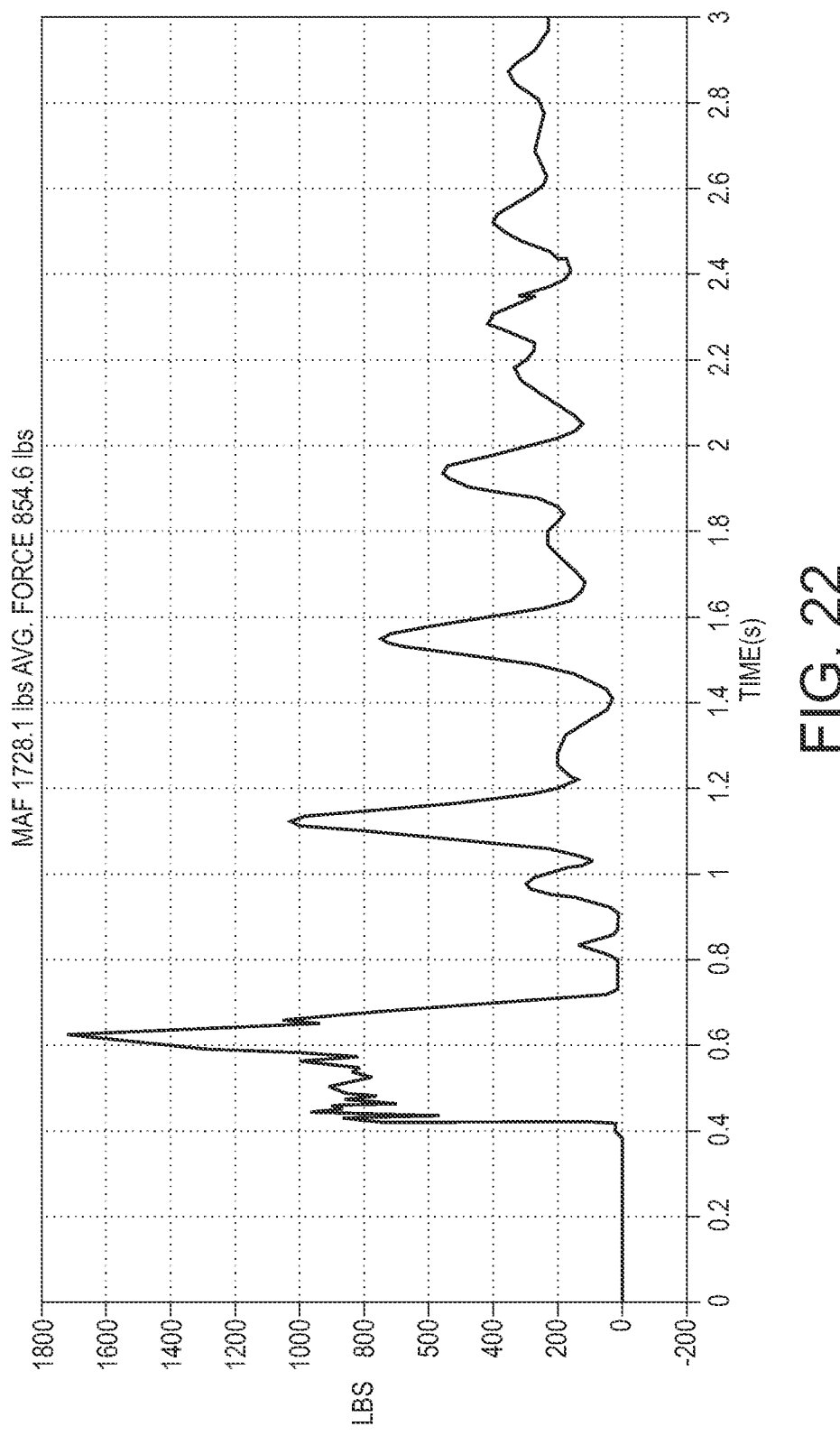
Figure 23:
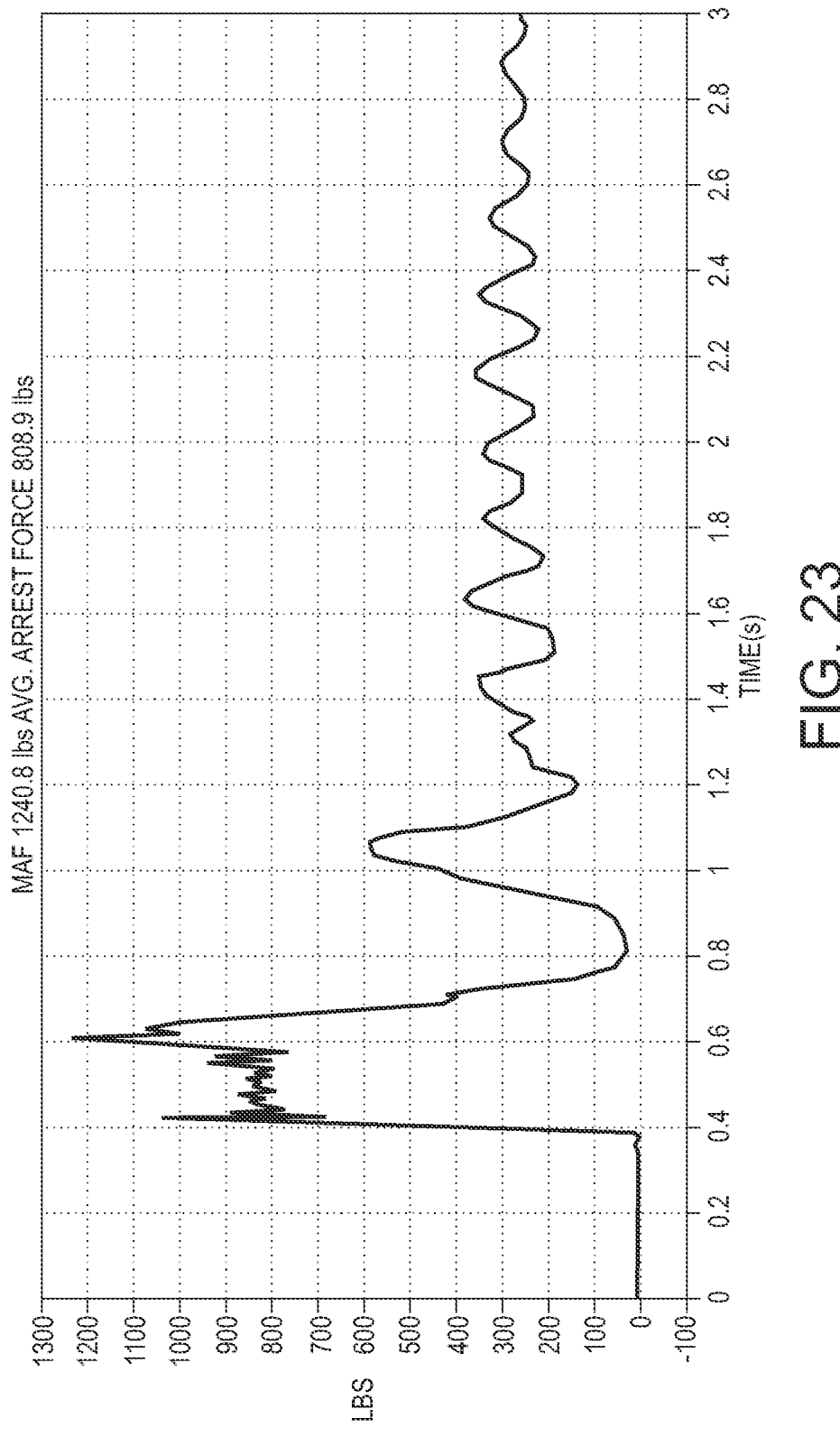
Figure 24:
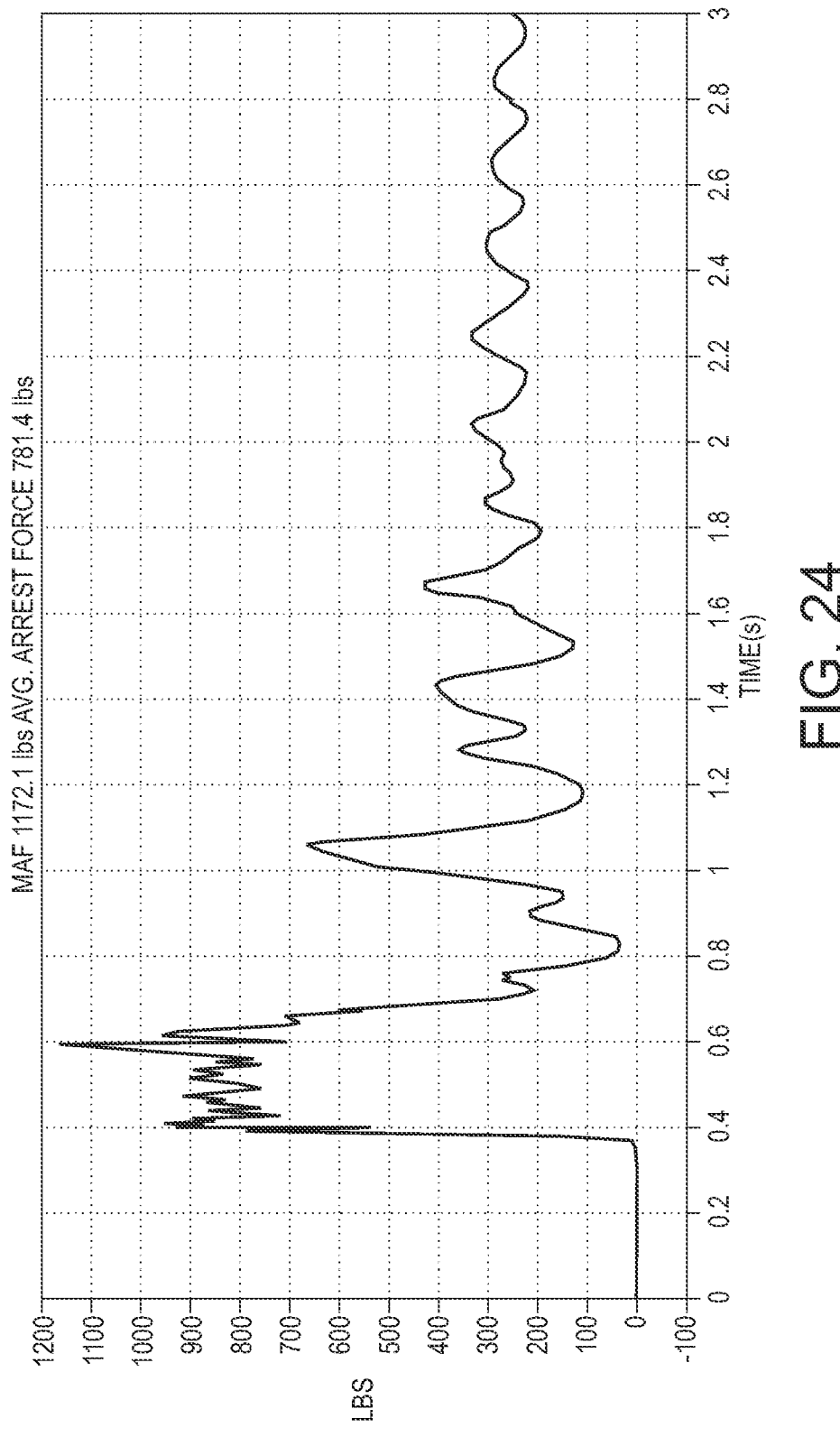

Referring now to FIGS. 22-24, which are graphical illustrations of drop tests performed according ANSI Z359 requirements in order to assess the dampening or attenuation of force provided by force dampers in accordance with the instant disclosure. In each of the drop tests of FIGS. 22-24, a 282 pound weight was utilized, the weight dropped from a same height free and clear of obstructions, and each force damper included a driving member shaft including a zig-zag-like folded portion as shown, for example, in FIGS. 18A and 18B. In some tests, one or more of a Belleville washer and/or one or more urethane semi-resilient members were utilized. As shown in FIG. 22, a dual housing/double spring force damper utilizing a 10" tear away/ripstop-type lanyard exhibited a Maximum Arresting Force (MAF)=1728.1 pounds and an Average Arresting Force (AAF)=854.6 pounds. As shown in FIG. 23, a single housing/single spring force damper utilizing a 10" tear away/ripstop-type lanyard exhibited a Maximum Arresting Force (MAF)=1240.8 pounds and an Average Arresting Force (AAF)=808.9 pounds. Finally, as shown in FIG. 24, a dual housing/double spring force damper utilizing a 12" tear away/ripstop-type lanyard exhibited a Maximum Arresting Force (MAF) =1172.1 pounds and an Average Arresting Force (AAF) =781.4 pounds. The aforementioned tests indicate that a force damper in accordance with instant disclosure comprises an improvement over currently known force dampers.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

PARTS LIST

50 Force Damper
51 1$^{st}$ Direction/Force

52 Housing
54 Driving Member
56 Resilient Member
58 1$^{st}$ End
60 2$^{nd}$ End
62 1$^{st}$ Surface
64 2$^{nd}$ Surface
66 1$^{st}$ Connection Point
68 Through bore
70 3$^{rd}$ Surface
72 Driving Member 1st End
74 Driving Member 2$^{nd}$ End
76 Driving Member Shaft
78 Driving Member Stop
80 2$^{nd}$ Connection Point
82 2$^{nd}$ Direction/Force
84 Block
86 Compression Spring
88 Securing Line
100 Force Damper
101 Direction/Force
102 Housing
104 Driving Member
106 1$^{st}$ Resilient Member
108 2$^{nd}$ Resilient Member
110 Housing 1$^{st}$ End
112 Housing 2$^{nd}$ End
114 1$^{st}$ Surface
116 2$^{nd}$ Surface
118 1$^{st}$ Connection Point
120 Through bore
122 3$^{rd}$ Surface
124 Driving Member 1$^{st}$ End
126 Driving Member 2$^{nd}$ End
128 Driving Member Shaft
130 Driving Member Stop
132 2$^{nd}$ Connection Point
134 2$^{nd}$ Direction/Force
136 Reinforcement Plate
138 Tube(s)
140 Tube Open Portion
142 2$^{nd}$ End Plate
144 Securing Line
146 Compression Spring
148 1$^{st}$ End Plate
150 Tube
152 Opening
154 Opening
156 Opening
158 Opening
160 Tube 138 End
162 Opening
200A-200E Force Damper
202 1$^{st}$ Direction/Force
204 Housing
206 Driving Member
208 Resilient Member
210 Compression Spring
212 Semi-Resilient Member (Washer)
214 Belleville Washer
216 1$^{st}$ End
218 2$^{nd}$ End
220 1$^{st}$ Surface
222 2$^{nd}$ Surface
224 1$^{st}$ Connection Point
226 Through Bore
228 End Wall

230 3$^{rd}$ Surface
232 Driving Member 1$^{st}$ End
234 Driving Member 2$^{nd}$ End
236 Driving Member Shaft
237 Zig-zag/Sinusoidal/Helical-like Portion
238 Driving Member stop
240 2$^{nd}$ Connection Point
242 2$^{nd}$ Direction/Force
244 Collapsible/Compressible/Compactable Portion
246 Structural Portion
248 Interstitial Portion

What is claimed is:

1. A force damper operatively arranged for a single-use when a first force is applied to the force damper in a first direction, the force damper providing a readily observable characteristic that the first force has been applied to the force damper in the first direction, the force damper arranged to progressively arrest the first force applied in the first direction, the force damper comprising:

a housing enclosure comprising a first housing end and a second housing end, the first housing end including a first connection point, and the second housing end including an opening;

a driving member disposed within the housing enclosure and comprising a first shaft end, a second shaft end, and a shaft therebetween, the first shaft end comprising a stop and the second shaft end comprising a second connection point; and, an elastically compressible member disposed within the housing enclosure between the stop and the opening, the elastically compressible member formed from a material that at least partially undergoes plastic deformation upon first application of the first force in the first direction and the first force is arrested, the elastically compressible member imparting a second force on the stop toward first housing end when the first force is applied, and, wherein, when the first force is applied and arrested, the at least partial plastic deformation of the elastically compressible member provides the readily observable characteristic that the first force has been applied to the force damper.

2. The force damper of claim 1, wherein the elastically compressible member comprises one or more of a compression spring, a semi-resilient member, or a Belleville washer.

3. The force damper of claim 1 comprising a plurality of elastically compressible members including at least each of a compression spring, a semi-resilient member, and a Belleville-washer, the second housing end opening comprising a through bore in an end wall thereof, and the second shaft end passes through the through bore.

4. The force damper of claim 3, wherein the semi-resilient member and the Belleville washer are disposed between the stop and the end wall.

5. The force damper of claim 3, comprising a first semi-resilient member and a second semi-resilient member, wherein the first semi-resilient member is disposed between a first terminal end of the compression spring and the stop, and the second semi-resilient member is disposed between a second terminal end of the compression spring opposite the first end, and the end wall.

6. The force damper of claim 3, wherein the semi-resilient member comprises a urethane washer.

7. The force damper of claim 3, wherein the Belleville washer is composed of one or more of a polymer, a metal, a frangible or fracturable material, or combinations thereof.

\* \* \* \* \*